United States Patent
Yamada et al.

(10) Patent No.: US 8,743,505 B2
(45) Date of Patent: Jun. 3, 2014

(54) FLUID DYNAMIC BEARING APPARATUS WITH SPECIFIC MINUTE GAP STRUCTURE WITH SPINDLE MOTOR AND DISK DRIVE APPARATUS INCLUDING SAME

(71) Applicants: Nidec Corporation, Kyoto (JP); Seagate Technology LLC, Cupertino, CA (US)

(72) Inventors: Hiroki Yamada, Kyoto (JP); Junya Mizukami, Kyoto (JP); Tsuyoshi Morita, Kyoto (JP); Tetsuya Maruyama, Kyoto (JP); Takuro Iguchi, Kyoto (JP); Troy Michael Herndon, San Jose, CA (US); Timothy Edward Langlais, Cupertino, CA (US)

(73) Assignees: Nidec Corporation, Kyoto (JP); Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/893,535

(22) Filed: May 14, 2013

(65) Prior Publication Data

US 2013/0243356 A1  Sep. 19, 2013

Related U.S. Application Data

(63) Continuation-in-part of application No. 12/742,931, filed as application No. PCT/JP2009/059556 on May 26, 2009, now Pat. No. 8,472,132.

(30) Foreign Application Priority Data

May 26, 2008 (JP) .................................. 2008-136648
May 12, 2009 (JP) .................................. 2009-115505

(51) Int. Cl.
*G11B 17/02* (2006.01)
*H02K 7/08* (2006.01)

(52) U.S. Cl.
USPC ........................... 360/99.08; 384/100; 310/90

(58) Field of Classification Search
USPC ........... 360/99.08, 98.07; 310/67 R, 90, 90.5; 384/100, 124
See application file for complete search history.

(56) References Cited

U.S. PATENT DOCUMENTS 6,664,687 B2 * 12/2003 Ichiyama ..................... 310/90.5
6,900,568 B2 * 5/2005 LeBlanc et al. ................. 310/90

(Continued)

FOREIGN PATENT DOCUMENTS

JP 2002-005171 A 1/2002
JP 2005-048890 A 2/2005

OTHER PUBLICATIONS

Yamada et al., "Fluid Dynamic Bearing Apparatus Arranged to Discharge Air Bubbles Generated Therein and a Spindle Motor and a Disk Drive Apparatus Including the Same", U.S. Appl. No. 12/742,931, filed May 14, 2010.

(Continued)

*Primary Examiner* — Brian Miller
(74) *Attorney, Agent, or Firm* — Keating & Bennett, LLP

(57) ABSTRACT

A fluid dynamic bearing apparatus includes a first minute gap, a second minute gap, a third minute gap, a fourth minute gap, and a fifth minute gap. A flow of a lubricating oil from the fifth minute gap to the fourth minute gap is caused by a plurality of dynamic pressure generating grooves arranged within the fluid dynamic bearing apparatus. This flow causes air bubbles mixed in the lubricating oil within the fifth minute gap to flow toward the third minute gap and be discharged to an outside of the fluid dynamic bearing apparatus through the third minute gap. The fluid dynamic bearing apparatus further includes a plurality of dynamic pressure generating grooves and an annular groove.

12 Claims, 19 Drawing Sheets

(56) References Cited

U.S. PATENT DOCUMENTS

| | | | |
|---|---|---|---|
| 7,411,762 B2 * | 8/2008 | Tamaoka | 360/99.08 |
| 7,489,059 B2 * | 2/2009 | Yajima | 310/90 |
| 7,825,557 B2 * | 11/2010 | Drautz et al. | 310/90 |
| 8,284,515 B2 * | 10/2012 | Sekii et al. | 360/99.08 |
| 8,472,132 B2 * | 6/2013 | Yamada et al. | 360/99.08 |
| 2004/0104634 A1 * | 6/2004 | Nishimura et al. | 310/90 |
| 2005/0116564 A1 * | 6/2005 | Tokunaga et al. | 310/90 |
| 2008/0061646 A1 * | 3/2008 | Kodama et al. | 310/90 |
| 2010/0033870 A1 * | 2/2010 | Sekii et al. | 360/99.08 |
| 2012/0063030 A1 * | 3/2012 | Yamada et al. | 360/99.08 |
| 2012/0250183 A1 * | 10/2012 | Tamaoka et al. | 360/99.08 |

OTHER PUBLICATIONS

Yamada et al., "Fluid Dynamic Bearing Apparatus, Spindle Motor, and a Disk Drive Apparatus Including the Same", U.S. Appl. No. 13/899,658, filed Oct. 7, 2010.

Yamada et al., "Fluid Dynamic Bearing Apparatus, Spindle Motor, and a Disk Drive Apparatus Including the Same", U.S. Appl. No. 13/299,542, filed Nov. 18, 2011.

* cited by examiner

FLUID DYNAMIC BEARING APPARATUS WITH SPECIFIC MINUTE GAP STRUCTURE WITH SPINDLE MOTOR AND DISK DRIVE APPARATUS INCLUDING SAME

FIELD OF THE INVENTION

The present invention relates to a fluid dynamic bearing apparatus, a spindle motor including the fluid dynamic bearing apparatus, and a disk drive apparatus including the spindle motor.

DESCRIPTION OF THE RELATED ART

In recent years, there has been a great demand for an increase in density as well as for a reduction in size, thickness, and weight, for apparatuses designed to drive recording disks, such as magnetic disks and optical discs, as used in personal computers, car navigation systems, and so on. Accordingly, there has been a demand for an increase in a rotation rate of spindle motors used therein to rotate the disks, and an improvement in accuracy of rotational operation thereof. In order to satisfy such demands, fluid dynamic bearing apparatuses, in which a gap between a shaft and a sleeve is filled with a lubricating oil, are now often used in place of traditional ball bearings, as bearing apparatuses for the spindle motors.

The fluid dynamic bearing apparatus includes a radial dynamic pressure bearing portion arranged to radially support the shaft or the sleeve, and a thrust dynamic pressure bearing portion arranged to axially support the shaft or the sleeve. Therefore, when the shaft and the sleeve are rotated relative to each other, dynamic pressure grooves provided in each of the radial dynamic pressure bearing portion and the thrust dynamic pressure bearing portion produce a pumping action to induce a fluid dynamic pressure on the lubricating oil filling a minute gap, thereby supporting the shaft or the sleeve radially and axially.

Spindle motors including such a fluid dynamic bearing apparatus are disclosed in JP-A 2002-5171 and JP-A 2005-48890, for example.

However, in conventional fluid dynamic bearing apparatuses, if the axial dimension of the shaft is reduced to make the fluid dynamic bearing apparatus thinner, the length of the radial dynamic pressure bearing portion is inevitably reduced to cause a reduction in radial stiffness. As a result, an external force, such as a shock, may cause a rotating member, such as the sleeve, or the shaft to tilt.

Also, in the case where a substantially cup-shaped member is adopted to maintain a sufficient length of the radial dynamic pressure bearing portion, the lubricating oil held in a minute gap between a lower surface of the rotating member including the sleeve and an upper surface of the substantially cup-shaped member, which is opposite to the lower surface of the rotating member, may come under negative pressure.

SUMMARY OF THE INVENTION

A first exemplary preferred embodiment of the present invention preferably includes a shaft arranged in an upward/downward direction to define a central axis; a substantially cup-shaped lower thrust washer including an annular portion and a tubular portion; and a rotating member including a cylindrical portion and arranged to rotate with respect to the shaft.

A first minute gap defined between an outer circumferential surface of the shaft and an inner circumferential surface of the cylindrical portion, a second minute gap defined between a lower surface of the cylindrical portion and an upper surface of the annular portion axially opposed thereto, and a third minute gap defined between an outer circumferential surface of the cylindrical portion and an inner circumferential surface of the tubular portion radially opposed thereto are in communication with one another. The first minute gap, the second minute gap, and the third minute gap are all filled with a lubricating oil.

The rotating member preferably includes a through hole filled with the lubricating oil, and an upper opening portion of the through hole is in communication with the first minute gap, while a lower opening portion of the through hole is in communication with the second minute gap.

The third minute gap includes a tapered seal portion where a radial width of the third minute gap gradually decreases in a downward direction. The lubricating oil has a liquid interface located within the tapered seal portion.

The second minute gap preferably includes a fourth minute gap and a fifth minute gap located radially outward of the fourth minute gap.

At least one of the lower surface of the cylindrical portion and the upper surface of the annular portion has provided thereon a plurality of thrust dynamic pressure generating grooves arranged to induce a fluid dynamic pressure on the lubricating oil held in the fourth minute gap during rotation of the rotating member.

The fourth minute gap preferably has a smaller axial dimension than that of the fifth minute gap.

The lower opening portion of the through hole is located at the fifth minute gap. At least one of a portion of the lower surface of the cylindrical portion and a portion of the upper surface of the annular portion, which together define the fifth minute gap, includes a plurality of dynamic pressure generating grooves and an annular groove.

The dynamic pressure generating grooves are arranged to induce a radially inward fluid dynamic pressure on the lubricating oil held in the fifth minute gap during the rotation of the rotating member.

The annular groove is arranged to surround the central axis. The annular groove is arranged radially outward of a radially inner end portion of each of the thrust dynamic pressure generating grooves and radially inward of a radially outer end portion of each of the dynamic pressure generating grooves.

At least one of the thrust dynamic pressure generating grooves is arranged to be in communication with the annular groove.

According to the first exemplary preferred embodiment of the present invention, a flow of the lubricating oil from the fifth minute gap to the fourth minute gap is caused by the plurality of dynamic pressure generating grooves. This causes air bubbles mixed in the lubricating oil within the fifth minute gap to flow toward the third minute gap and be discharged to an outside through the third minute gap. In addition, since a flow of the lubricating oil into the third minute gap as caused by a centrifugal force accompanying the rotation is inhibited, the lubricating oil held in the second minute gap is prevented from coming under negative pressure. Moreover, the use of the substantially cup-shaped thrust washer as the lower thrust washer contributes to reducing the thickness of the fluid dynamic bearing apparatus.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Figure 2:
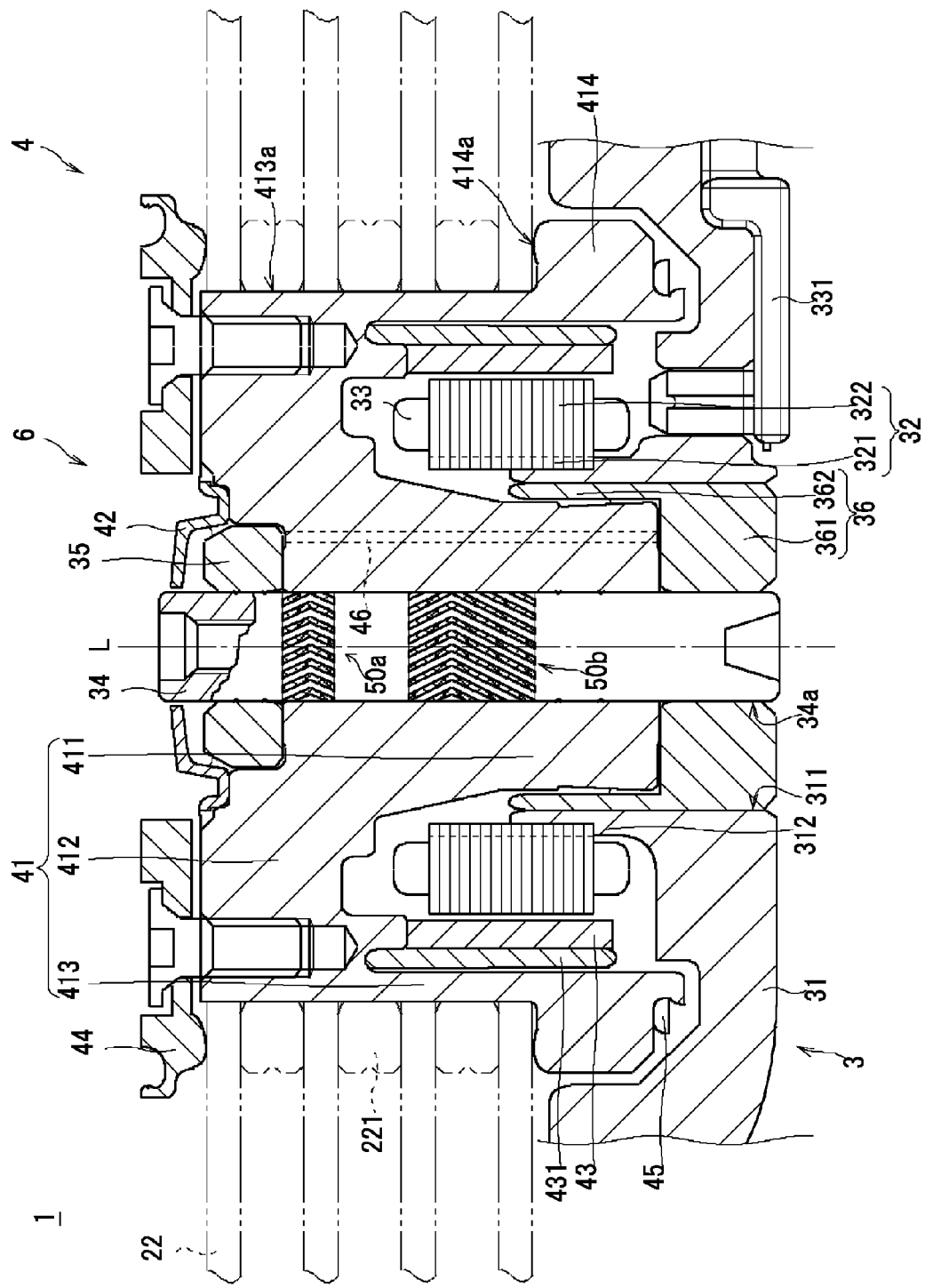
FIG. 2 is a cross-sectional view of a spindle motor according to a preferred embodiment of the present invention taken along a plane including the central axis.

Hereinafter, preferred embodiments of the present invention will be described with reference to the accompanying drawings. Note that terms referring to "upward", "downward", "left", "right", etc., as used in the description of the present invention to describe relative positions or directions of different members are simply used with reference to the accompanying drawings, and should not be construed as describing relative positions or directions of those members when actually installed in a device. In the following description, for the sake of convenience in description, a side on which a rotor portion 4 is arranged and a side on which a stationary portion 3 is arranged along a central axis L are assumed to be an upper side and a lower side, respectively, as shown in FIG. 2.

Figure 1:
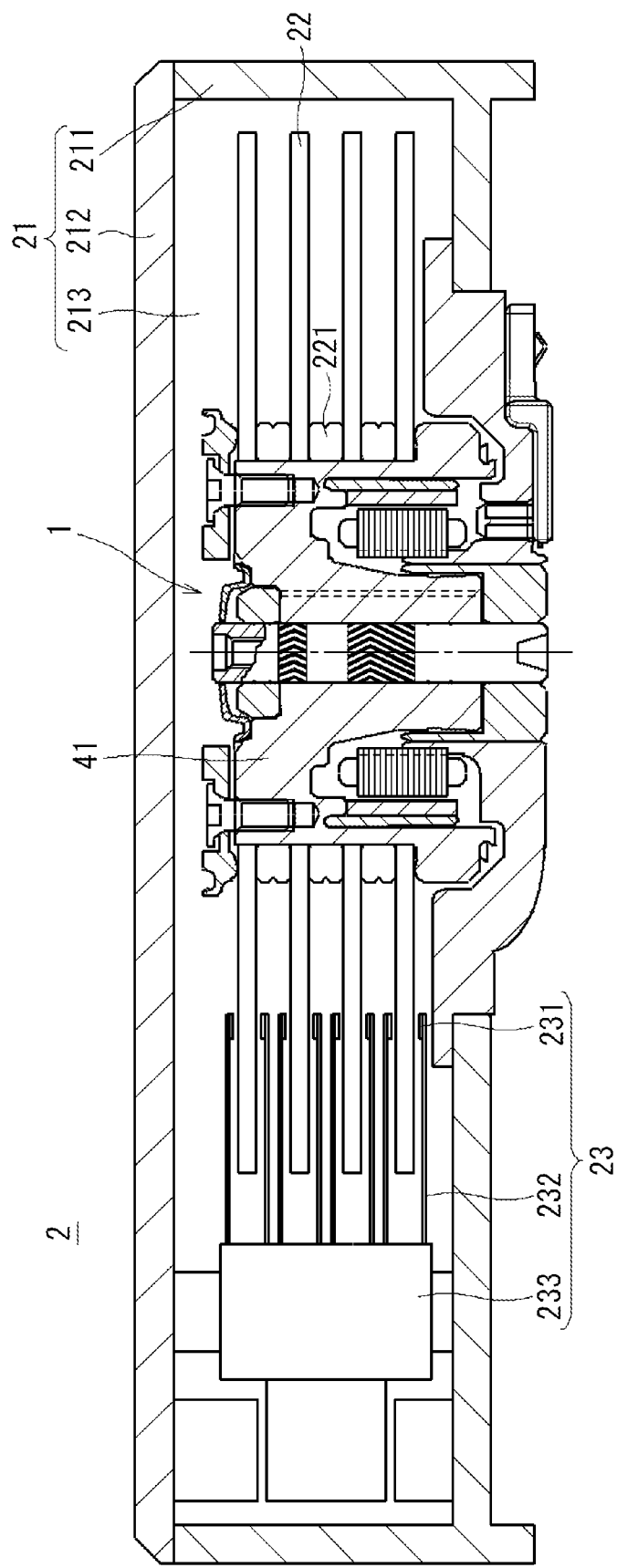
FIG. 1 is a cross-sectional view of a disk drive apparatus according to a preferred embodiment of the present invention taken along a plane including a central axis.

FIG. 1 is a cross-sectional view of a disk drive apparatus 2 including a spindle motor 1 according to an exemplary preferred embodiment of the present invention, taken along a plane including the central axis. The disk drive apparatus 2 reads information from any of (e.g., four) magnetic disks 22 and/or writes information to any of the magnetic disks 22 while rotating the magnetic disks 22. The disk drive apparatus is, for example, a hard disk apparatus. As illustrated in FIG. 1, the disk drive apparatus 2 includes an apparatus housing 21, the four magnetic disks (hereinafter referred to simply as "disks") 22, an access portion 23, and the spindle motor 1.

The apparatus housing 21 preferably includes a cup-shaped first housing member 211 and a plate-shaped second housing member 212. The first housing member 211 includes an opening at its top. The spindle motor 1 and the access portion 23 are disposed on an inside bottom surface of the first housing member 211. The second housing member 212 is joined to the first housing member 211 to cover the top opening of the first housing member 211. The disks 22, the access portion 23, and the spindle motor 1 are contained in an interior space 213 of the apparatus housing 21 which is enclosed by the first housing member 211 and the second housing member 212. The interior space 213 of the apparatus housing 21 is preferably a clean space with little dirt or dust.

Each of the disks 22 is preferably a flat circular information recording medium with a central hole. Each of the disks 22 is attached to a rotating member 41 of the spindle motor 1, and they are arranged one upon another to be parallel or substantially parallel with and equally spaced from one another with the use of spacers 221. On the other hand, the access portion 23 includes heads 231 (e.g., eight heads 231 in this preferred embodiment), which are arranged opposite to upper and lower surfaces of the disks; arms 232 arranged to support each of the heads 231; and an actuator mechanism 233 arranged to actuate the arms 232 (e.g., eight arms 232 in this preferred embodiment). The access portion 23 uses the actuator mechanism 233 to move the arms 232 along the disks 22, and thus causes any of the heads 231 to access a required position on a corresponding one of the rotating disks 22 to perform a read and/or write of information on a recording surface of the disk 22. Note that each head 231 may be arranged to only either read or write information from or to the recording surface of the disk 22.

Next, a detailed structure of the spindle motor 1 will be described below. FIG. 2 is a cross-sectional view of the spindle motor 1 taken along a plane including the central axis. As illustrated in FIG. 2, the spindle motor 1 includes the stationary portion 3, which is fixed to the apparatus housing 21 of the disk drive apparatus 2, and the rotor portion 4, which is arranged to rotate about the specified central axis L with the disks 22 attached thereto.

The stationary portion 3 preferably includes a base member 31, a stator core 32, coils 33, and a shaft 34.

The base member 31 is preferably made of a metallic material such as aluminum, for example, and is screwed to the apparatus housing 21 of the disk drive apparatus 2. At a central portion of the base member 31 are provided a through hole 311, which passes through the base member 31 along the central axis L, and a substantially cylindrical holder portion 312 projecting upward. Note that, although the base member 31 and the first housing member 211 preferably are separate members in the present preferred embodiment, the base member 31 and the first housing member 211 may be a single integral member in other preferred embodiments.

The stator core 32 includes an annular core back 321, which is fit into an outer circumferential surface of the holder portion 312 of the base member 31, and a plurality of tooth portions 322, which project radially outward from the core back 321 (note that the terms "radial", "radially", "radial direction", etc., as used herein refer to directions perpendicular or substantially perpendicular to the central axis L, as appropriate.). The stator core 32 is defined by, for example, by a lamination of steel sheets, i.e., electromagnetic steel sheets arranged one upon another in an axial direction.

Each coil 33 is preferably defined by a lead wire wound around a separate one of the tooth portions 322 of the stator core 32. The coils 33 are connected to a specified power supply unit (not shown) through a connector 331. A drive current is supplied from the power supply unit to the coils 33 through the connector 331, so that radial magnetic flux is produced around each tooth portion 322. The magnetic flux produced around the tooth portions 322 interact with magnetic flux of a rotor magnet 43 described below to produce torque to rotate the rotor portion 4 about the central axis L. Thus, the rotor portion 4 is rotated about the central axis L with respect to the stationary portion 3, so that the four disks 22 supported on the rotating member 41 are rotated about the central axis L together with the rotating member 41.

The shaft 34 is a substantially columnar member arranged along the central axis L. An upper thrust washer 35 having a substantially annular shape and a lower thrust washer 36 substantially in the shape of a cup with an open top are fixed to an outer circumferential surface 34a of the shaft 34 via, for example, an adhesive or the like, such that the washers 35 and 36 are axially spaced from each other.

The lower thrust washer 36 includes a lower annular portion 361 and a tubular portion 362. The lower annular portion 361 is a portion that is fixed to the outer circumferential surface 34a of the shaft 34, and arranged to project radially outward from the outer circumferential surface 34a of the shaft 34. The tubular portion 362 is a portion that projects upward from a radially outer edge of the lower annular portion 361. The lower thrust washer 36 is in the shape of a cup with an open top. In addition, the lower thrust washer 36 is fit within the through hole 311 of the base member 31, and in this condition fixed to the base member 31. The upper thrust washer 35 and the lower thrust washer 36 are preferably made of, for example, a resin material or a metallic material (e.g., an alloy having aluminum as its primary element, an alloy having copper as its primary element, etc.) which has a coefficient of linear expansion close to that of the rotating member 41 described below. Note that a lower thrust washer in which the lower annular portion and the tubular portion are formed by separate members can be adopted instead, without departing from the scope of the present invention.

Note that, although the upper thrust washer 35 and the lower thrust washer 36 are each preferably defined by a member separate from the shaft 34 in the present preferred embodiment, this is not essential to the present invention. For example, either the upper thrust washer 35 or the lower thrust washer 36 may be formed integrally with the shaft 34 in other preferred embodiments. Also, both the upper thrust washer 35 and the lower thrust washer 36 may be integral with the shaft 34 in other preferred embodiments.

In the present preferred embodiment, the shaft 34 is fixed to the base member 31 through the lower thrust washer 36. That is, the spindle motor 1 according to the present preferred embodiment is preferably a fixed-shaft motor. In the fixed-shaft motor, the shaft 34 remains still when the disks 22 are rotated. Therefore, even if extraneous vibration is applied to the disk drive apparatus 2, the disks 22 will suffer less deflection than they would if a rotating-shaft motor were used. Therefore, the use of the fixed-shaft motor contributes to reducing errors in reading and/or writing data from or to the disks 22. Note that the deflection of the disks 22 due to extraneous vibration can be further reduced by fixing an upper and a lower end of the shaft 34 to the housing 21.

The rotor portion 4 preferably includes the rotating member 41, a cap 42, and the rotor magnet 43.

Next, the rotating member 41 will be described below. The rotating member 41 preferably includes a cylindrical portion 411, a plate portion 412, and an extension portion 413. The cylindrical portion 411 has an inner circumferential surface 411c (shown in FIG. 2) arranged opposite to the outer circumferential surface 34a of the shaft 34 with a minute gap (which is, for example, several micrometers wide) therebetween. The plate portion 412 stretches radially outward from a vicinity of an upper end portion of the cylindrical portion 411. The extension portion 413 extends downward from an outer circumferential edge of the plate portion 412.

The cylindrical portion 411 is a substantially cylindrical portion that is arranged radially outward of the shaft 34 such that the inner circumferential surface 411c thereof surrounds the shaft 34. The cylindrical portion 411 is arranged between the upper thrust washer 35 and the lower thrust washer 36, and is supported to be rotatable with respect to the shaft 34, the upper thrust washer 35, and the lower thrust washer 36.

The rotor magnet 43 is preferably attached to a lower surface of the plate portion 412 of the rotating member 41 through a yoke 431. The rotor magnet 43 is arranged in a ring so as to encircle the central axis L. An inner circumferential surface of the rotor magnet 43 defines a pole surface, and is arranged opposite to outer circumferential surfaces of the tooth portions 322 of the stator core 32.

An outer circumferential surface 413a of the extension portion 413 defines a contact surface with which an inner circumferential portion (i.e., an inner circumferential surface or edge) of the disks 22 makes contact. In addition, a stand portion 414 is provided near a lower end portion of the extension portion 413. The stand portion 414 projects radially outward therefrom, and an upper surface 414a of the stand portion 414 defines a flange surface on and above which the disks 22 are mounted.

The four disks 22 are arranged one upon another on and above the flange surface 414a of the rotating member 41 such that the disks 22 are in a horizontal orientation and equally spaced from one another. More specifically, the lowermost one of the disks 22 is mounted on the flange surface 414a, and the other disks 22 are mounted thereabove with each spacer 221 placed between a pair of neighboring disks 22. An upper surface of the uppermost one of the disks 22 is pressed and positioned by a hold-down member 44 attached to the plate portion 412 of the rotating member 41. The inner circumferential portion of each disk 22 makes contact with the outer circumferential surface 413a of the extension portion 413, so that radial movement of each disk 22 is prevented. In the present preferred embodiment, a primary material for both the disks 22 and the rotating member 41 is preferably aluminum, for example. Therefore, the disks 22 and the rotating member 41 have the same or similar coefficient of linear expansion, and even if a change of temperature occurs, an excessive stress will never occur between the disks 22 and the rotating member 41.

A ring 45 is attached to the outer circumferential surface of the extension portion 413 below the stand portion 414, in order to correct unevenness in mass distribution of the rotor portion 4. The ring 45 serves to improve rotational accuracy of the rotor portion 4 with respect to the central axis L, by correcting unevenness in mass distribution of the rotor portion 4.

Figure 3:
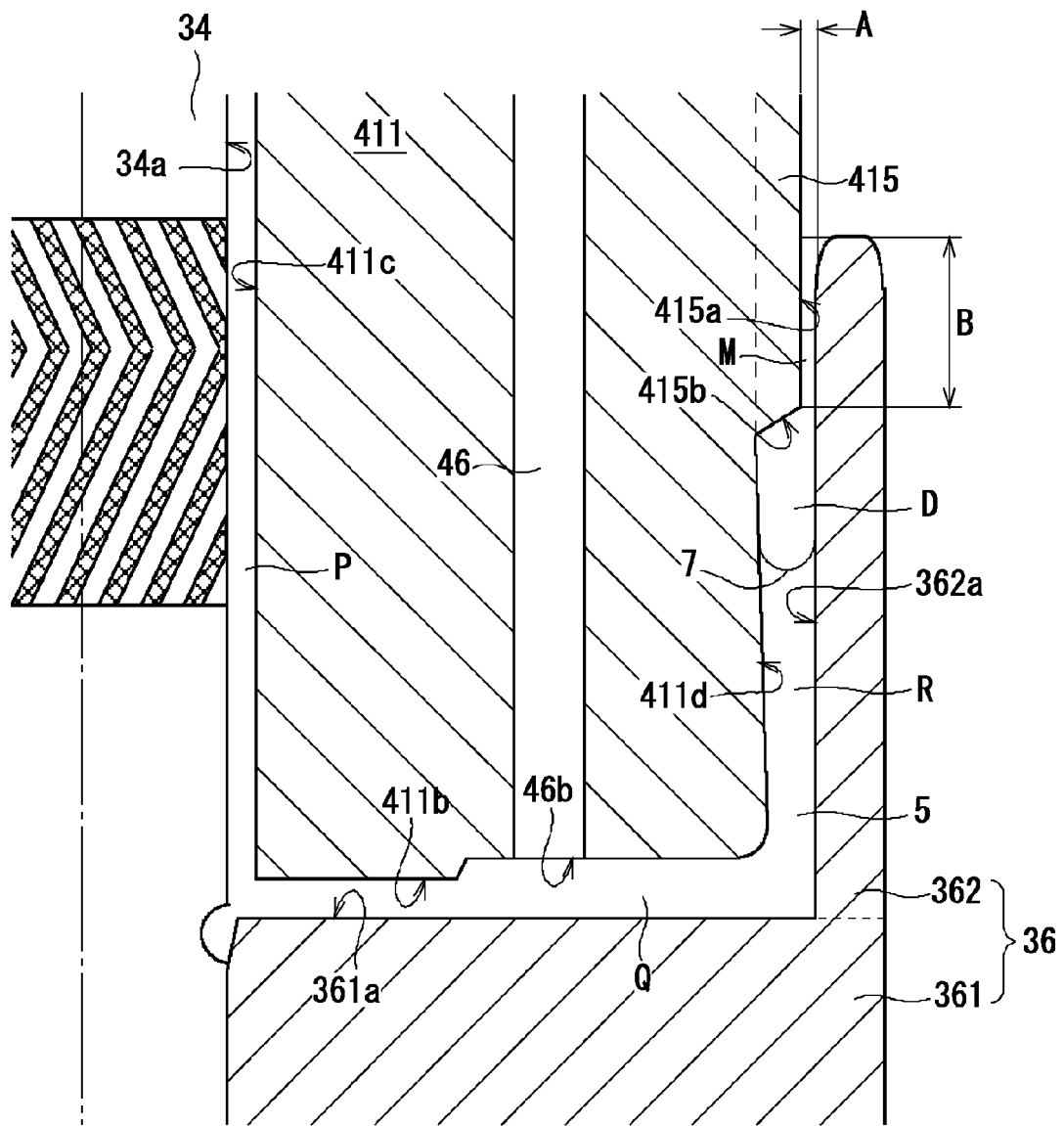
FIG. 3 is a cross-sectional view of the structure of a lower thrust washer and its surroundings taken along a plane including the central axis, illustrating a labyrinth structure according to a preferred embodiment of the present invention.

Referring to FIG. 3, the minute gap defined between the outer circumferential surface 34a of the shaft 34 and the inner circumferential surface 411c of the cylindrical portion 411 will be referred to as a first minute gap P; a minute gap defined between a lower surface 411b of the cylindrical portion 411 and an upper surface 361a of the lower annular portion 361, which is axially opposed thereto, will be referred to as a second minute gap Q; and a minute gap defined between an outer circumferential surface 411d of the cylindrical portion 411 and an inner circumferential surface 362a of the tubular portion 362, which is radially opposed thereto, will be referred to as a third minute gap R. The first minute gap P, the second minute gap Q, and the third minute gap R are in communication with one another without an interruption, and these gaps are filled with a lubricating oil 5.

Examples of the lubricating oil 5 preferably include polyolester oil, diester oil, and other types of oil having ester as its main ingredient, for example. Oils having ester as their main ingredient are excellent in wear resistance, thermal stability, and fluidity, and are therefore suitable for use as the lubricating oil 5 in a fluid dynamic bearing apparatus 6. Note that the fluid dynamic bearing apparatus 6 is preferably an apparatus that includes at least the shaft 34, the upper thrust washer 35, the lower thrust washer 36, the rotating member 41, and the cap 42.

The lubricating oil 5 preferably includes a pair of liquid interfaces one at an upper portion and the other at a lower portion of the fluid dynamic bearing apparatus 6. The upper liquid interface is located between the upper thrust washer 35 and the cap 42. The lower liquid interface is located between the lower thrust washer 36 and the rotating member 41.

As illustrated in FIG. 3, in the third minute gap R is arranged a tapered seal portion 7, where the radial width of the third minute gap R gradually decreases in a downward direction and in which the liquid interface (i.e., a meniscus) of the lubricating oil 5 is arranged at a location where surface tension and external atmospheric pressure are balanced against each other. The provision of the tapered seal portion 7 produces an action of attracting the lubricating oil 5 downward when the lubricating oil 5 is induced to leak out. This contributes to preventing upward leakage of the lubricating oil 5, and thus preventing leakage of the lubricating oil 5 out of the motor 1. The liquid interface of the tapered seal portion 7 may sometimes move upward because of an increase in volume of the lubricating oil 5 due to an increase in centrifugal force, temperature, and so on, or because of some other action. However, the surface tension of the lubricating oil 5 and the external atmospheric pressure will be balanced against each other to prevent a discharge of the lubricating oil 5 out of the motor 1.

In the present preferred embodiment, the cup-shaped lower thrust washer 36 is used, and the liquid interface of the lubricating oil 5 is thus retained between the tubular portion 362 of the lower thrust washer 36 and the cylindrical portion 411 of the rotating member 41, with the liquid interface facing upward. This contributes to reducing the axial dimension of the fluid dynamic bearing apparatus 6, as compared with a case where the interface of the lubricating oil 5 is arranged to face downward.

Referring to FIG. 3, in the present preferred embodiment, an overhang portion 415 preferably protrudes radially outward from the outer circumferential surface 411d of the cylindrical portion 411 to cover the liquid interface of the lubricating oil 5 within the third minute gap R from above. The overhang portion 415 and the tubular portion 362 of the lower thrust washer 36 are radially opposed to each other to define a labyrinth structure. In more detail, an outer circumferential surface 415a of the overhang portion 415 and the inner circumferential surface 362a of the tubular portion 362 are opposed to each other with a minute gap M therebetween. The radial width A of the minute gap M is set to be sufficiently small. Note that the "sufficiently small" width as mentioned in reference to the width A means a sufficiently small width to produce an effect described below, and also refers to a sufficiently small width to permit air bubbles to be discharged through the minute gap M. The protruding position of the overhang portion 415 is arranged so that a lower surface 415b of the overhang portion 415 is located above the liquid interface of the lubricating oil 5 within the third minute gap R. The liquid interface at the tapered seal portion 7 may sometimes move upward within the third minute gap R because of a volume increase due to a temperature increase or the like or because of some other action. The lower surface 415b of the overhang portion 415 is preferably arranged at a higher level than a level of the liquid interface when the upward movement thereof has occurred. Moreover, the axial dimension B of the minute gap M is arranged to be a specified axial distance. For example, dimensions of the lower thrust washer 36 and those of the rotating member 41 are set such that a lower end of the overhang portion 415 will be positioned below an upper surface of the tubular portion 362 when the rotating member 41 has been elevated to the highest possible relative level with respect to the lower thrust washer 36. When the minute gap M has the specified axial dimension B as described above, the liquid interface of the lubricating oil 5 within the third minute gap R is unlikely to come into contact with external fresh air.

Because of the above-described arrangements, a space (hereinafter denoted by D) surrounded by the liquid interface of the lubricating oil 5, the outer circumferential surface 411d of the cylindrical portion 411, the lower surface 415b of the overhang portion 415, and the inner circumferential surface 362a of the tubular portion 362 is a substantially closed space. This contributes to preventing air in the space D, which is in contact with the liquid interface of the lubricating oil 5 defined within the third minute gap R, from being replaced by the external fresh air, resulting in effective prevention of evaporation of the lubricating oil 5.

Because the space D is a substantially closed space, not only inhibition of the evaporation of the lubricating oil 5 at ordinary temperatures is achieved, but also inhibition of the evaporation of the lubricating oil 5 at high temperatures is achieved. In more detail, when the lubricating oil 5 is circulated due to a dynamic pressure bearing during rotation of the rotating member 41, an inner wall of each member contributing to defining any of the minute gaps rubs against the lubricating oil 5 and may generate frictional heat to add heat to the lubricating oil 5. When this happens, the added heat makes it easier for the lubricating oil 5 to evaporate. In the present preferred embodiment, the space D is a substantially closed space, and therefore, the air staying in the space D contains vapor of the lubricating oil nearly in saturation. This inhibits the evaporation of the lubricating oil 5. This contributes to preventing a decrease in the amount of the lubricating oil within the fluid dynamic bearing apparatus 6, and in turn prolonging the life of the fluid dynamic bearing apparatus 6.

Next, referring to FIG. 4, the structure of the second minute gap Q and its surroundings according to the present preferred embodiment will now be described below. Hereinafter, a radially inner region and a radially outer region of the second minute gap Q will be referred to as a fourth minute gap S and a fifth minute gap T, respectively. In other words, the second minute gap Q includes the fourth minute gap S and the fifth minute gap T, which is located radially outward of the fourth minute gap S. The axial width (dimension) X of the fourth minute gap S is set to be smaller than the axial width (dimension) Y of the fifth minute gap T.

In a first preferred embodiment, a step is provided on the lower surface 411*b* of the cylindrical portion 411 of the rotating member 41, which is opposite to the upper surface 361*a* of the lower annular portion 361 of the lower thrust washer 36, as a construction to provide a difference in axial width between the radially inner region and the radially outer region of the second minute gap Q. In more detail, the rotating member 41 is structured such that the lower surface 411*b* of the cylindrical portion 411 thereof includes a first flat portion 411*ba*, which extends substantially perpendicularly to the central axis L, and a second flat portion 411*bb*, which is arranged radially outward of and adjacent to the first flat portion 411*ba* and positioned at a higher level than the first flat portion 411*ba*. Here, a minute gap defined between the first flat portion 411*ba* of the lower surface 411*b* of the cylindrical portion 411 and the opposed upper surface 361*a* of the lower annular portion 361 corresponds to the fourth minute gap S, whereas a minute gap defined between the second flat portion 411*bb* and the opposed upper surface 361*a* of the lower annular portion 361 corresponds to the fifth minute gap T.

The fourth minute gap S is a region having a relatively small axial width within the second minute gap Q. This allows "lower thrust dynamic pressure generating grooves" 65 described below to generate a fluid dynamic pressure on the lubricating oil 5 held in the fourth minute gap S excellently. On the other hand, the fifth minute gap T is a region having a relatively large axial width within the second minute gap Q. This contributes to reducing a loss when the rotating member 41 is rotated with respect to the lower thrust washer 36. This leads to a reduced increase in a current value of the motor.

It is desirable that the axial width X of the fourth minute gap S and the axial width Y of the fifth minute gap T be set such that a reduction in the loss during the rotation of the rotating member 41 is achieved while excellent generation of the fluid dynamic pressure due to the lower thrust dynamic pressure generating grooves 65 is achieved. For example, the dimensions of each member may be set such that, during the rotation of the rotating member 41, the axial width X of the fourth minute gap S preferably falls within a range of about 5 μm to about 20 μm, for example, and the axial width Y of the fifth minute gap T preferably falls within a range of about 30 μm to about 60 μm, for example. More preferably, the axial width Y of the fifth minute gap T is set in a range of about 37 μm to about 47 μm, for example.

A lower thrust dynamic pressure bearing portion is provided in the fourth minute gap S, whereas a lower pumping action portion is provided in the fifth minute gap T. The lower thrust dynamic pressure bearing portion and the lower pumping action portion induce a fluid dynamic pressure to direct the lubricating oil 5 within the fourth minute gap S and the fifth minute gap T, respectively, radially inward. It is so arranged that this radially inward pumping force caused by the lower thrust dynamic pressure bearing portion and the lower pumping action portion is greater than a centrifugal force generated within the second minute gap Q (i.e., the fourth minute gap S and the fifth minute gap T) during the rotation of the rotating member 41. The lower thrust dynamic pressure bearing portion and the lower pumping action portion will now be described below with reference to FIGS. 4 and 5.

First, the lower thrust dynamic pressure bearing portion, which serves to support the rotating member 41 in the axial direction, will now be described below. A thrust dynamic pressure bearing portion arranged to support an axial load is provided in the fourth minute gap S, which is defined between a "rotating member thrust bearing surface" located at the first flat portion 411*ba* of the cylindrical portion 411 of the rotating member 41 and a "lower thrust washer bearing surface" opposed thereto and located at the upper surface 361*a* of the lower annular portion 361 of the lower thrust washer 36. That is, the plurality of lower thrust dynamic pressure generating grooves 65, which serve to induce the fluid dynamic pressure on the lubricating oil 5 during the relative rotation, are provided on at least one of the rotating member thrust bearing surface and the lower thrust washer bearing surface. The thrust dynamic pressure bearing portion in the fourth minute gap S is realized by the action of the plurality of lower thrust dynamic pressure generating grooves 65.

Figure 4:
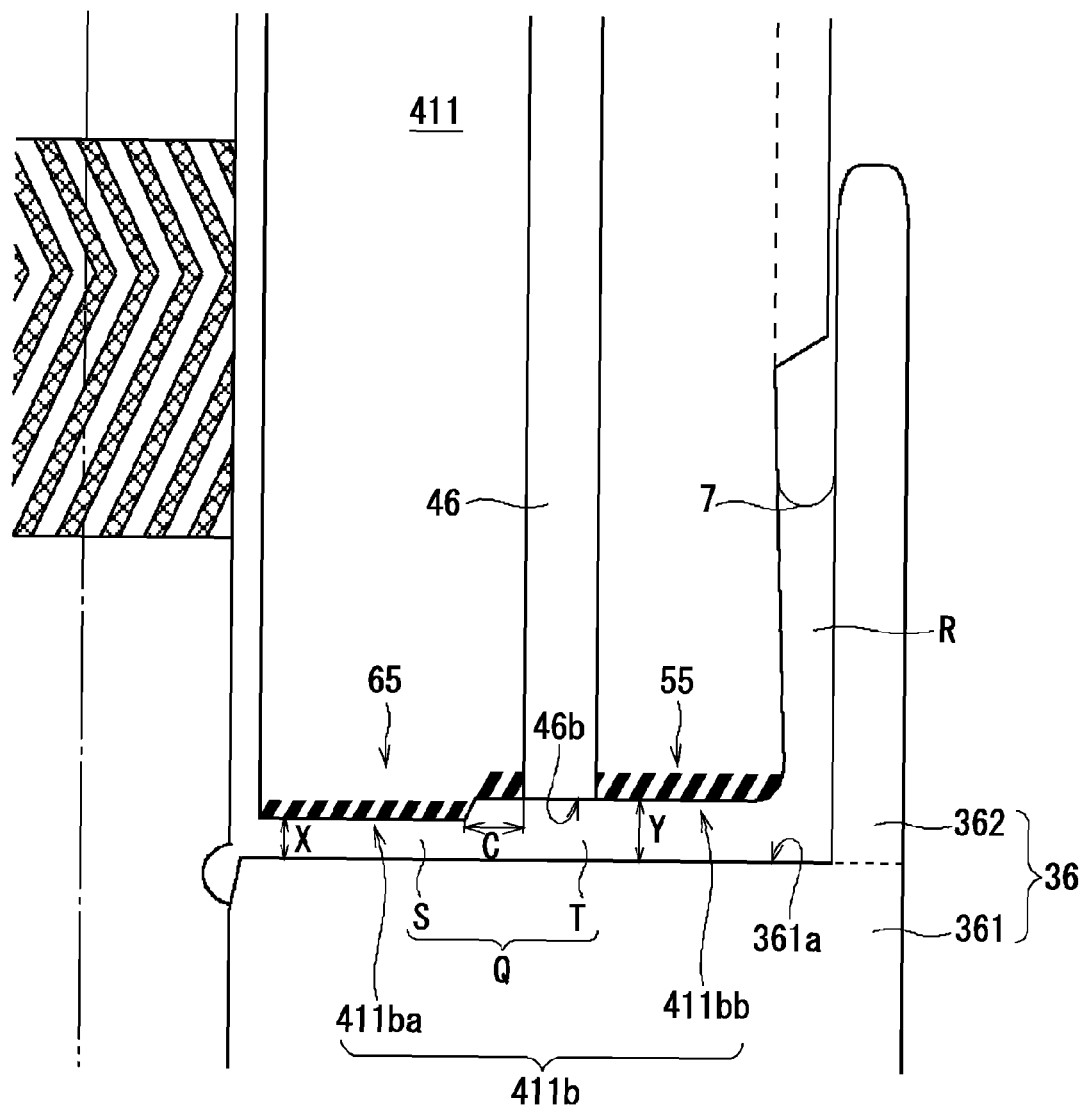
FIG. 4 is a cross-sectional view of the structure of the lower thrust washer and its surroundings taken along a plane including the central axis, in which a step is provided on a lower surface of a cylindrical portion of a rotating member according to a preferred embodiment of the present invention.
Figure 5:
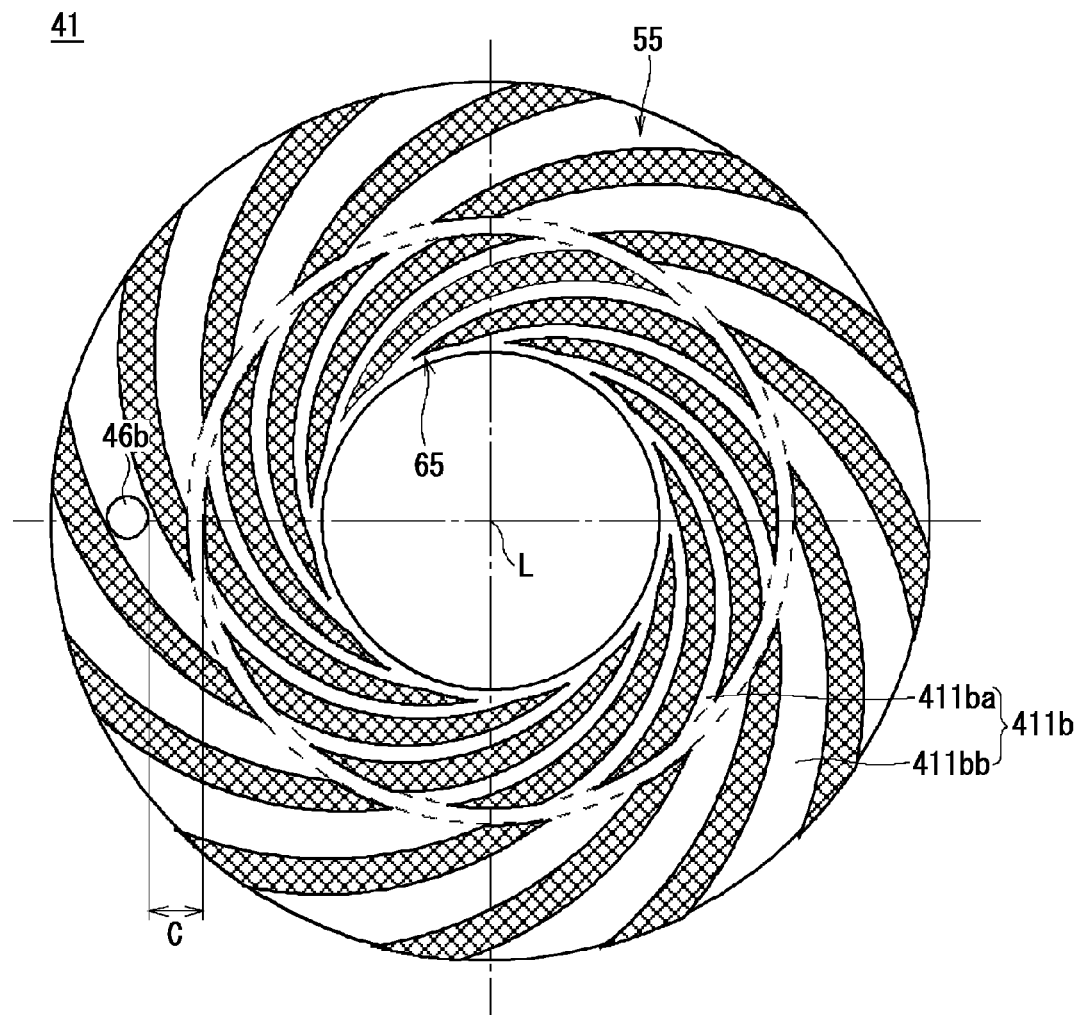
FIG. 5 is a bottom view of the rotating member according to a preferred embodiment of the present invention.

As illustrated in FIGS. 4 and 5, in the present preferred embodiment, the plurality of lower thrust dynamic pressure generating grooves 65 are preferably provided, preferably in the form of spirals spreading radially outward away from the central axis L, on the first flat portion 411*ba* of the cylindrical portion 411 of the rotating member 41.

Therefore, when rotational drive of the rotating member 41 is started to drive the rotating member 41 to rotate with respect to the lower thrust washer 36, a pumping action of the lower thrust dynamic pressure generating grooves 65 is caused to induce the fluid dynamic pressure on the lubricating oil 5 held within the fourth minute gap S. Thus, the rotating member 41 is supported in the axial direction without a contact with the lower thrust washer 36, to be rotatable with respect to the lower thrust washer 36.

Note that the lower thrust dynamic pressure generating grooves 65 may not necessarily have a spiral pattern, but may also have a herringbone pattern or a tapered land pattern, for example, in other preferred embodiments, as long as they function as a fluid dynamic bearing. Also note that, although the lower thrust dynamic pressure generating grooves 65 are provided on the first flat portion 411*ba* of the cylindrical portion 411 of the rotating member 41 in the present preferred embodiment, the lower thrust dynamic pressure generating grooves 65 may be provided on the upper surface 361*a* of the lower annular portion 361 of the lower thrust washer 36 in other preferred embodiments.

Next, the lower pumping action portion provided in the fifth minute gap T will now be described below. A plurality of dynamic pressure generating grooves (hereinafter referred to as a plurality of pumping grooves), which are arranged to induce the fluid dynamic pressure on the lubricating oil 5 during the relative rotation, are provided on at least one of the second flat portion 411*bb* of the cylindrical portion 411 of the rotating member 41 and the upper surface 361*a* of the lower annular portion 361 of the lower thrust washer 36. The lower pumping action portion in the fifth minute gap T is realized by the action of the plurality of pumping grooves.

As illustrated in FIGS. 4 and 5, in the present preferred embodiment, a lower pumping groove array 55, which includes the plurality of pumping grooves in a spiral pattern, is provided on the second flat portion 411bb of the cylindrical portion 411 of the rotating member 41. In the present preferred embodiment, the lower pumping groove array 55 is illustrated as an example of the plurality of dynamic pressure generating grooves.

Thus, once the rotational drive of the rotating member 41 is started, the action of the lower pumping groove array 55 induces a radially inward fluid dynamic pressure on the lubricating oil 5 filling the fifth minute gap T, causing the lubricating oil 5 to flow radially inward. This contributes to preventing the outward leakage of the lubricating oil 5 through the tapered seal portion 7 in the third minute gap R. That is, the lubricating oil 5 within the third minute gap R receives pressure in such a direction that it is drawn toward the fifth minute gap T. Meanwhile, the lubricating oil 5 within the fifth minute gap T receives pressure to flow in a direction toward the thrust dynamic pressure bearing portion in the fourth minute gap S (i.e., in a direction away from an outside of the fluid dynamic bearing apparatus 6). This contributes to preventing the outward discharge and scattering of the lubricating oil 5 and intrusion of air. This enables a long-term use of the fluid dynamic bearing apparatus 6. Moreover, a radially outward flow of the lubricating oil 5 within the fourth minute gap S by the action of the rotational centrifugal force or the like is prevented. This contributes to avoiding a lack of required fluid dynamic pressure due to an insufficient amount of lubricating oil 5 for the thrust dynamic pressure bearing portion in the fourth minute gap S.

As described above, the lower pumping groove array 55 is arranged to promote the radially inward flow of the lubricating oil 5. The configuration of the lower pumping groove array 55 and the dimensions of each member are set so that the pressure generated on the lubricating oil 5 within the fifth minute gap T will be smaller than the pressure generated on the lubricating oil 5 within the fourth minute gap S.

Note that the lower pumping groove array 55 may not necessarily have the spiral pattern, but may have, for example, a herringbone pattern or a tapered land pattern in other preferred embodiments. In the case where the herringbone pattern is adopted for the lower pumping groove array 55, a radially outer portion is preferably arranged to be longer than a radially inner portion in each of a plurality of hook-shaped grooves constituting a herringbone. Also note that, although the lower pumping groove array 55 is provided on the second flat portion 411bb of the cylindrical portion 411 of the rotating member 41 in the present preferred embodiment, the lower pumping groove array 55 may be provided on the upper surface of the lower annular portion of the lower thrust washer in other preferred embodiments.

The axial depth of the lower pumping groove array 55 is preferably greater than the axial depth of the lower thrust dynamic pressure generating grooves 65. For example, the axial depth of the lower pumping groove array 55 and the axial depth of the lower thrust dynamic pressure generating grooves 65 may be set at, for example, about 25 µm and about 10 µm, respectively. In addition, the axial width Y of the fifth minute gap T is preferably greater than the sum of the axial width X of the fourth minute gap S and the axial depth of the lower thrust dynamic pressure generating grooves 65.

As illustrated in FIGS. 2, 3, 4, and 6, the rotating member 41 includes one or more through holes 46 extending in the axial direction within the cylindrical portion 411 from an upper surface 411a to the lower surface 411b of the cylindrical portion 411 of the rotating member 41. The through hole 46 is structured such that an upper opening portion 46a of the through hole 46 is open at the upper surface 411a of the cylindrical portion 411 to be in communication with the first minute gap P, and that a lower opening portion 46b of the through hole 46 is open to the second minute gap Q. The through hole 46 is filled with the lubricating oil 5. As illustrated in FIG. 7, the upper opening portion 46a of the through hole 46 is provided within an area stretching from a sixth minute gap U to upper thrust dynamic pressure generating grooves 70 on the upper surface 411a of the cylindrical portion 411.

As illustrated in FIG. 4, in the present preferred embodiment, the lower opening portion 46b of the through hole 46 is located at the fifth minute gap T. In other words, the lower opening portion 46b of the through hole 46 is open at the second flat portion 411bb of the cylindrical portion 411 of the rotating member 41.

It is desirable that an opening position of the lower opening portion 46b on the second flat portion 411bb be positioned a specified distance C outside of a radially outer opening portion of the fourth minute gap S. The "specified distance C" is a distance such as to prevent suction into the fourth minute gap S by the action of the lower thrust dynamic pressure generating grooves 65 from having a significant influence on an air bubble which may intrude into the lubricating oil 5 and, passing through the through hole 46, flow into the fifth minute gap T. The lower pumping groove array 55 is provided at least in a surface area corresponding to this specified distance C. Because the lower opening portion 46b of the through hole 46 and the radially outer opening portion of the fourth minute gap S are the specified distance C away from each other according to the above-described structure, an air bubble which has flowed into the fifth minute gap T after passing through the through hole 46 is unlikely to flow into the fourth minute gap S, so that a flow of the air bubble into a radial dynamic pressure bearing portion can be prevented.

Whether the lubricating oil 5 flows toward the fourth minute gap S or toward the third minute gap R after passing through the through hole 46 and flowing into the fifth minute gap T is determined as follows. Behavior of the lubricating oil 5 and air bubbles mixed therein is significantly affected by capillary force. The lubricating oil 5 tends to flow from a region with a lower capillary force (where the width of the gap is greater) to a region with a higher capillary force (where the width of the gap is smaller), and in reaction thereto, the air bubbles tend to travel from the region with a higher capillary force (where the width of the gap is smaller) to the region with a lower capillary force (where the width of the gap is greater). In the present preferred embodiment, because the axial width X of the fourth minute gap S is smaller than the axial width Y of the fifth minute gap T, the lubricating oil 5 flows toward the fourth minute gap S, instead of toward the third minute gap R.

Moreover, in the present preferred embodiment, the lower pumping groove array 55 is provided on the second flat portion 411bb of the cylindrical portion 411 of the rotating member 41. Thus, the action of the lower pumping groove array 55 promotes the radially inward flow of the lubricating oil 5 within the fifth minute gap T. Thus, the pressure increases at radially inner positions within the fifth minute gap T to cause the air bubbles to flow toward radially outer positions, where the pressure is lower. Accordingly, the air bubbles mixed in the lubricating oil 5 flow toward the third minute gap R, instead of the fourth minute gap S, and are discharged to the outside through the third minute gap R.

The lower pumping groove array 55 acts to generate a radially inward pressure on the lubricating oil 5, which has a high viscosity, while it is less likely to generate a radially inward pressure on the air bubbles, which have a low viscosity. Accordingly, the lubricating oil 5 flows radially inward, while the air bubbles travel radially outward.

Furthermore, the lower pumping groove array 55 acts to stir the lubricating oil 5 in the vicinity of the lower opening portion 46b of the through hole 46. The air bubbles carried through the through hole 46 to the fifth minute gap T are stirred by the lower pumping groove array 55 and broken into finer bubbles. Once the air bubbles are broken into finer bubbles, the resulting air bubbles and the lubricating oil 5 are mixed more thoroughly. This allows the radially inward flow of the lubricating oil 5 and the accompanying radially outward movement of the air bubbles to occur more efficiently. Accordingly, the air bubbles are discharged to the outside efficiently.

Furthermore, the lower thrust dynamic pressure bearing portion and the lower pumping action portion induce a radially inward fluid dynamic pressure on the lubricating oil 5 within the fourth minute gap S and the fifth minute gap T (i.e., within the second minute gap Q). This contributes to preventing the centrifugal force caused by the rotation from causing the lubricating oil 5 to flow into the third minute gap R. Thus, the lubricating oil 5 held in the second minute gap Q is prevented from coming under negative pressure. Therefore, the use of a substantially cup-shaped thrust washer as the lower thrust washer 36 is possible to achieve a reduction in thickness of the fluid dynamic bearing apparatus 6.

Note that the term "negative pressure" as used in the above description refers to a pressure lower than a normal atmospheric pressure. When the pressure is lower than the normal atmospheric pressure, the air bubbles tend to be generated more easily within the lubricating oil 5. In the present preferred embodiment, the second minute gap Q is prevented from entering such a negative pressure condition.

Next, other portions of the bearing structure according to the present preferred embodiment than the lower thrust dynamic pressure bearing portion and the lower pumping action portion described above will now be described below with reference to FIGS. 2 and 6 to 9.

The radial dynamic pressure bearing portion, which is arranged to support a radial load, is provided in the first minute gap P defined between a "rotating member radial bearing surface" located on the inner circumferential surface 411c of the cylindrical portion 411 of the rotating member 41 and a "shaft radial bearing surface" located on the opposed outer circumferential surface 34a of the shaft 34. In other words, radial dynamic pressure generating grooves 50, which are arranged to induce a fluid dynamic pressure on the lubricating oil 5 during the relative rotation, are provided on at least one of the rotating member radial bearing surface and the shaft radial bearing surface. The radial dynamic pressure bearing portion in the first minute gap P is realized by the action of the radial dynamic pressure generating grooves 50.

Figure 9:
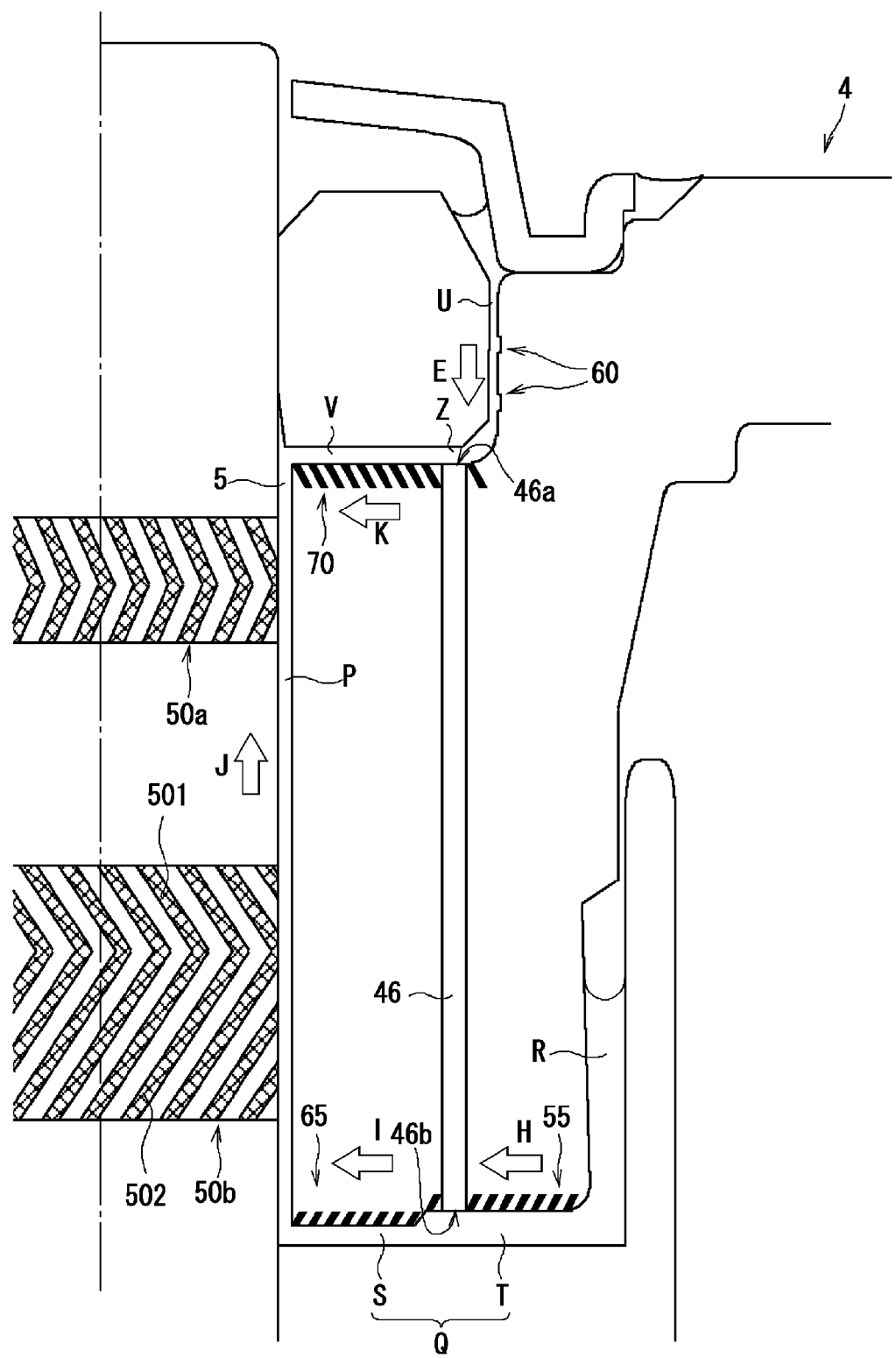
FIG. 9 is a cross-sectional view illustrating each minute gap and each dynamic pressure generating groove according to a preferred embodiment of the present invention, taken along a plane including the central axis.

As illustrated in FIGS. 2 and 9, in the present preferred embodiment, radial dynamic pressure generating grooves 50a and 50b (collectively denoted by reference numeral 50) in a herringbone pattern are provided on the outer circumferential surface 34a of the shaft 34 so as to be axially spaced from each other.

Therefore, when the rotation of the rotating member 41 is started to drive the rotating member 41 to rotate with respect to the shaft 34, the radial dynamic pressure generating grooves 50a and 50b produce a pumping action to induce the fluid dynamic pressure on the lubricating oil 5 filling the first minute gap P. Thus, the rotating member 41 is supported radially without a contact with the shaft 34 to be rotatable with respect to the shaft 34.

The radial dynamic pressure generating grooves 50b include a plurality of first parallel or substantially parallel grooves 501, which are arranged to cause the lubricating oil 5 to flow downward, and a plurality of second parallel or substantially parallel grooves 502, which are arranged to cause the lubricating oil 5 to flow upward. The second grooves 502 have a greater axial dimension than that of the first grooves 501. Therefore, the radial dynamic pressure generating grooves 50b act to cause the lubricating oil 5 to flow upward as a whole within the first minute gap P.

Note that the radial dynamic pressure generating grooves 50 may not necessarily have the herringbone pattern, but may have, for example, a spiral pattern or a tapered land pattern in other preferred embodiments, as long as they function as a fluid dynamic bearing. Also note that, although the radial dynamic pressure generating grooves 50 are provided on the outer circumferential surface 34a of the shaft 34 in the present preferred embodiment, this is not essential to the present invention. For example, the radial dynamic pressure generating grooves may be provided on the inner circumferential surface of the cylindrical portion of the rotating member, i.e., on the rotating member radial bearing surface, in other preferred embodiments.

Figure 8:
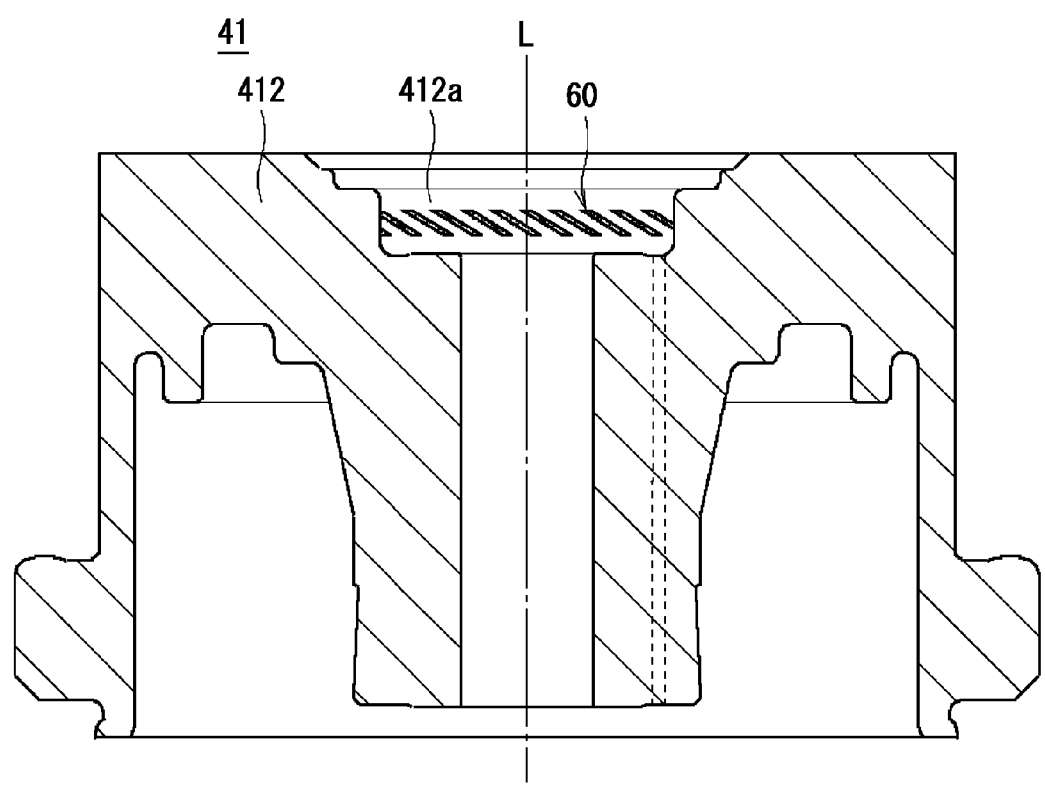
FIG. 8 is a cross-sectional view of only the rotating member according to a preferred embodiment of the present invention taken along a plane including the central axis.

Next, an upper pumping action portion arranged between the upper thrust washer 35 and the rotating member 41 will now be described below with reference to FIGS. 6 and 8. FIG. 8 is a cross-sectional view of only the rotating member taken along a plane including the central axis.

Figure 6:
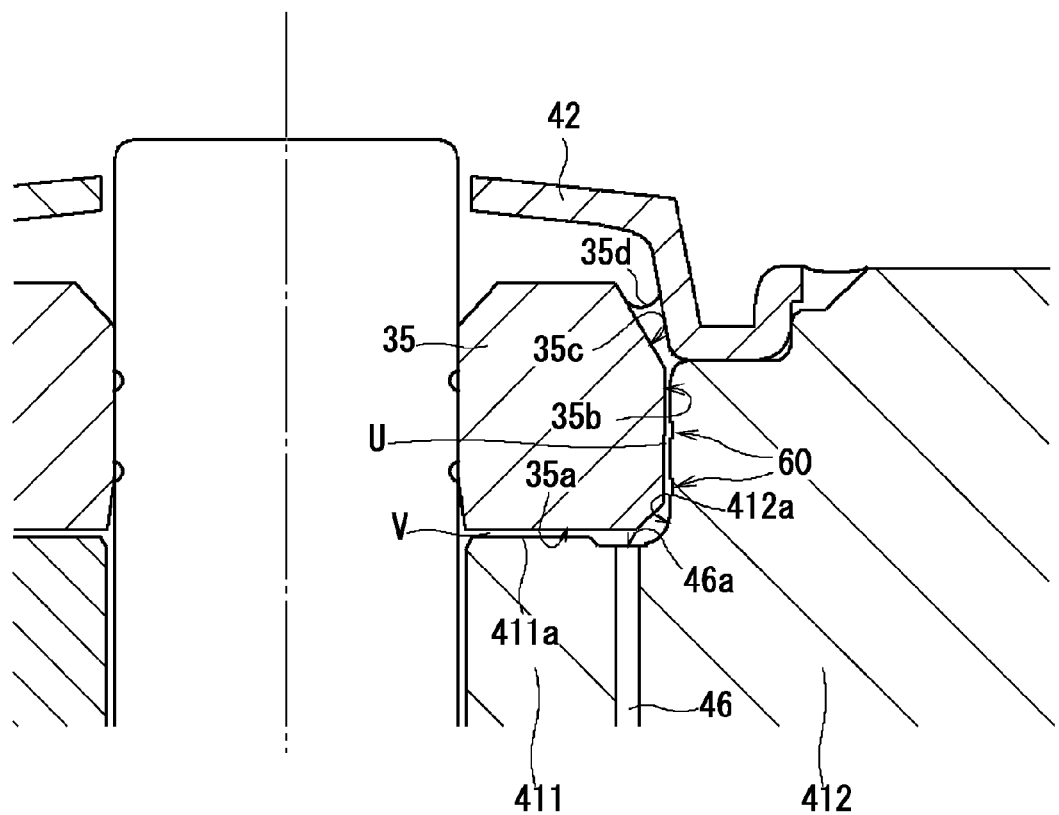
FIG. 6 is a cross-sectional view of the structure of an upper thrust washer according to a preferred embodiment of the present invention and its surroundings taken along a plane including the central axis.
Figure 7:
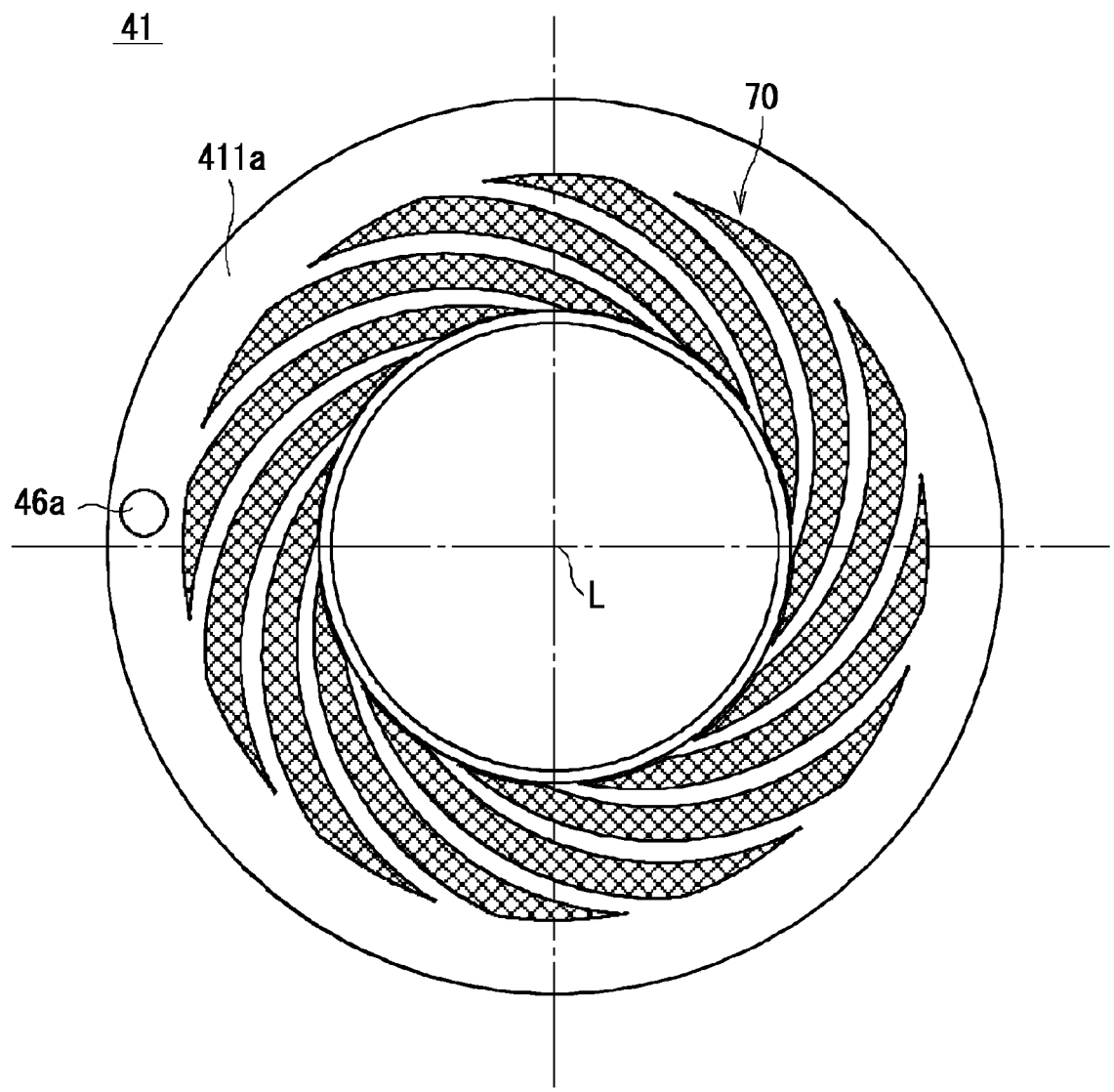
FIG. 7 is a top view of the rotating member according to a preferred embodiment of the present invention.

FIG. 6 is a cross-sectional view of the structure of the upper thrust washer 35 and its surroundings taken along a plane including the central axis. As illustrated in FIG. 6, the upper thrust washer 35 has a lower surface 35a arranged opposite to the upper surface 411a of the cylindrical portion 411 of the rotating member 41; an outer circumferential surface 35b arranged opposite to an inner circumferential surface 412a of the plate portion 412 of the rotating member 41; and a tapered surface 35c arranged to gradually converge in an upward direction from a top of the outer circumferential surface 35b.

The rotating member 41 includes the cap 42, which has a shaft hole in its center. The cap 42 is fixed to an upper surface of the plate portion 412 of the rotating member 41. The cap 42 is arranged to cover the upper thrust washer 35 from above, and is fixed to the rotating member 41 through, for example, an adhesive or the like applied to an outer circumferential portion of the cap 42. A tapered seal portion 35d opening upward and inclining slightly inward is arranged between the tapered surface 35c of the upper thrust washer 35 and the cap 42 opposite to the tapered surface 35c. Therefore, the lubricating oil 5 between the tapered surface 35c and the cap 42 is attracted downward by a surface tension. In addition, because the tapered seal portion 35d between the tapered surface 35c and the cap 42 is open slightly inward, the centrifugal force accompanying the rotation of the rotating member 41 applies a radially outward energy to the lubricating oil 5 between the tapered surface 35c and the cap 42. The above actions contribute to preventing the lubricating oil 5 from leaking out of the space between the tapered surface 35c of the upper thrust washer 35 and the cap 42.

The inner circumferential surface 412a of the plate portion 412 of the rotating member 41 is opposed to the outer circumferential surface 35b of the upper thrust washer 35 with the sixth minute gap U therebetween, to define a pumping seal portion in the sixth minute gap U. The upper pumping action portion is arranged in the sixth minute gap U. Specifically, a plurality of pumping grooves, which are arranged to induce a fluid dynamic pressure on the lubricating oil 5 during the relative rotation, are provided on at least one of the inner circumferential surface 412a of the plate portion 412 and the outer circumferential surface 35b of the upper thrust washer

35. The upper pumping action portion in the sixth minute gap U is realized by the action of the plurality of pumping grooves.

In the present preferred embodiment, an upper pumping groove array 60 including the plurality of pumping grooves is provided on the inner circumferential surface 412*a* of the plate portion 412 of the rotating member 41.

Therefore, once the rotational drive of the rotating member 41 is started, the action of the upper pumping groove array 60 applies a pressure on the lubricating oil 5 filling the sixth minute gap U to promote a downward flow of the lubricating oil 5 (so as to allow it to travel away from the outside of the fluid dynamic bearing apparatus 6). This contributes to preventing the outward discharge and scattering of the lubricating oil 5. This enables long-term use of the fluid dynamic bearing apparatus 6.

Moreover, in the present preferred embodiment, the upper liquid interface of the lubricating oil 5 is retained by a combined use of the tapered seal portion 35*d* and the upper pumping action portion. Therefore, an additional reduction in axial dimension of the tapered seal portion 35*d* can be achieved, as compared with the case where the interface of the lubricating oil 5 is retained by use of the tapered seal portion alone.

Note that, although the upper pumping groove array 60 is provided on the inner circumferential surface 412*a* of the plate portion 412 of the rotating member 41 in the present preferred embodiment, the upper pumping groove array may be provided on the outer circumferential surface of the upper thrust washer in other preferred embodiments.

Next, an upper thrust dynamic pressure bearing portion, which is arranged to support the rotating member 41 axially, will now be described below with reference to FIGS. 6 and 7.

The upper thrust dynamic pressure bearing portion, which is arranged to support an axial load, is provided in a seventh minute gap V defined between a "rotating member thrust bearing surface" located at the upper surface 411*a* of the cylindrical portion 411 of the rotating member 41 and an "upper thrust washer bearing surface" located at the opposed lower surface 35*a* of the upper thrust washer 35. Specifically, the plurality of upper thrust dynamic pressure generating grooves 70, which are arranged to induce a fluid dynamic pressure on the lubricating oil 5 during the relative rotation, are provided on at least one of the rotating member thrust bearing surface and the upper thrust washer bearing surface. The thrust dynamic pressure bearing portion in the seventh minute gap V is realized by the action of the upper thrust dynamic pressure generating grooves 70.

As illustrated in FIGS. 6 and 7, in the present preferred embodiment, the upper thrust dynamic pressure generating grooves 70 are provided, in the form of spirals spreading radially outward away from the central axis L, on the upper surface 411*a* of the cylindrical portion 411 of the rotating member 41.

Therefore, once the rotational drive of the rotating member 41 is started to drive the rotating member 41 to rotate with respect to the upper thrust washer 35, a pumping action of the upper thrust dynamic pressure generating grooves 70 induces the fluid dynamic pressure on the lubricating oil 5 held in the seventh minute gap V. Thus, the rotating member 41 is supported axially without a contact with the upper thrust washer 35 so as to be rotatable with respect to the upper thrust washer 35.

In the seventh minute gap V, the lubricating oil 5 is caused to flow radially inward by the action of the upper thrust dynamic pressure generating grooves 70, while at the same time the flow of the lubricating oil 5 from the first minute gap P into the seventh minute gap V causes a radially outward flow of the lubricating oil 5. The lubricating oil 5 flowing radially outward in the seventh minute gap V flows into the through hole 46, and flows downward within the through hole 46.

Note that, although the upper thrust dynamic pressure generating grooves 70 are provided on the upper surface 411*a* of the cylindrical portion 411 of the rotating member 41 in the present preferred embodiment, the upper thrust dynamic pressure generating grooves may be provided on the lower surface of the upper thrust washer in other preferred embodiments.

As described above, the radial dynamic pressure generating grooves 50*b* act to cause the lubricating oil 5 to flow upward within the first minute gap P. Therefore, as illustrated in FIG. 9, the lubricating oil 5 circulates through the fluid dynamic bearing apparatus 6 in the following order: 1) the first minute gap P, 2) the seventh minute gap V, 3) the through hole 46, 4) the fourth minute gap S (more specifically, the second minute gap Q), and 5) the first minute gap P.

Next, the amount of the downward pumping force caused by the upper pumping action portion will now be described below. As illustrated in FIG. 9, the lubricating oil 5 within the seventh minute gap V is sent radially outward by the pressure of the above-described circulation, and flows into the through hole 46 through the upper opening portion 46*a* of the through hole 46. Here, the centrifugal force accompanying the rotational drive of the rotating member 41 and the pressure accompanying the above-described circulation may allow the lubricating oil 5 within the seventh minute gap V to flow into the sixth minute gap U, instead of into the through hole 46. However, this problem can be substantially overcome in the present preferred embodiment.

In more detail, it is so arranged that the downward pumping force E caused by the upper pumping action portion in the sixth minute gap U is greater than the sum of a pressure applied to the lubricating oil 5 in a vicinity Z of the upper opening portion of the through hole 46 and the centrifugal force at the vicinity Z of the upper opening portion of the through hole 46 which accompanies the rotation of the rotating member 41. The "pressure applied to the lubricating oil in the vicinity Z of the upper opening portion of the through hole 46" mentioned above refers to a pressure that is applied to the lubricating oil 5 in the vicinity Z of the upper opening portion of the through hole 46 and which accompanies the circulation of the lubricating oil 5. This is influenced by a radially inward pumping force H caused by the lower pumping action portion, a radially inward pumping force I caused by the lower thrust dynamic pressure bearing portion, an upward pumping force J caused by the radial dynamic pressure bearing portion, and a radially inward pumping force K caused by the upper thrust dynamic pressure bearing portion. The centrifugal force is influenced by a rotation rate and a rotational speed of the rotating member 41, and so on. In this preferred embodiment, each of the pumping forces and the centrifugal force are set so as to satisfy the aforementioned relative magnitude.

The above arrangement contributes to effectively preventing the leakage of the lubricating oil 5 to the space outside of the fluid dynamic bearing apparatus 6, and preventing contamination as a result of the lubricating oil 5 being adhered to any other member such as the disks 22. This enables the long-term use of the fluid dynamic bearing apparatus 6.

In the present preferred embodiment, the pressure on the lubricating oil 5 in the vicinity of the upper opening portion 46*a* of the through hole 46 caused by the upper pumping action portion is greater than the pressure on the lubricating oil 5 in a vicinity of the lower opening portion 46*b* of the through hole 46. This pressure gradient promotes the downward flow of the lubricating oil 5 within the through hole 46. Air bubbles dragged into the lubricating oil 5 by the upper pumping groove array 60 are lead to the through hole 46 and then, traveling through the through hole 46, the fifth minute gap T, and the third minute gap R, are discharged to the outside effectively.

Thus, the intrusion of the air bubbles into the radial dynamic pressure bearing portion, the upper thrust dynamic pressure bearing portion, or the lower thrust dynamic pressure bearing portion is substantially prevented. This contributes to reducing a decrease in the rotational accuracy of the rotor portion 4 with respect to the stationary portion 3, and preventing an error in a read and/or a write from or to any of the disks 22. Moreover, the efficient discharge of the air bubbles to the outside contributes to preventing a loss during the rotation and a leakage of the lubricating oil 5 as a result of expansion of the air bubbles.

Figure 15:
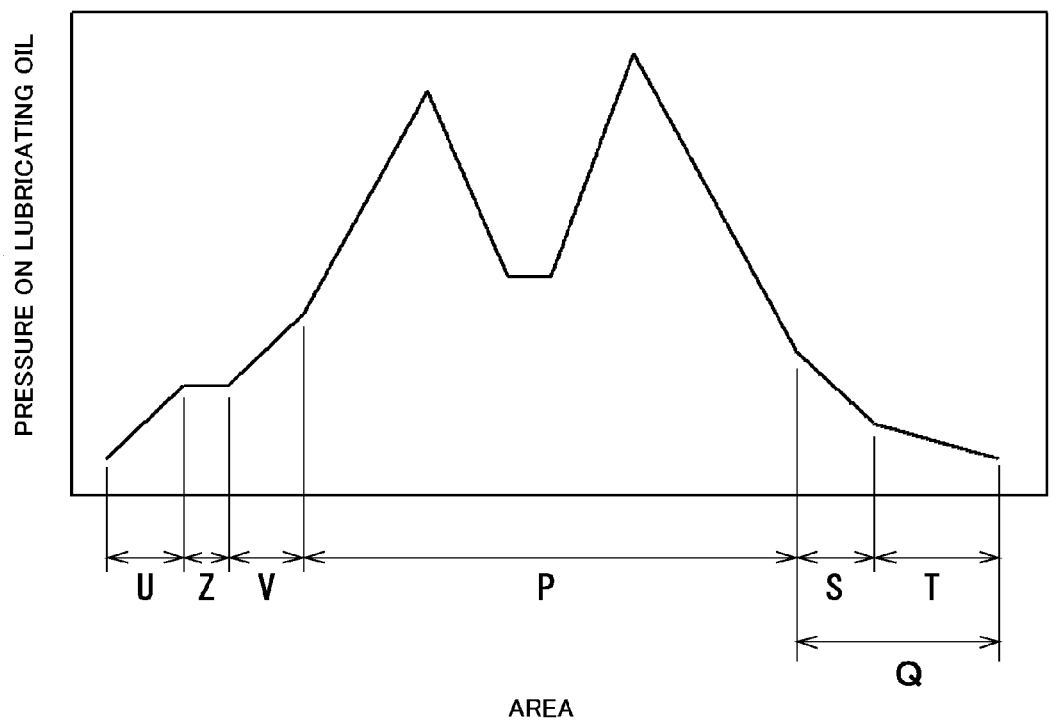
FIG. 15 is a graph showing a pressure distribution of lubricating oil in a preferred embodiment of the present invention.

FIG. 15 is a graph showing a pressure distribution of the lubricating oil 5. A horizontal axis in FIG. 15 represents an area, stretching from the upper liquid interface to the lower liquid interface, where the lubricating oil 5 exists, and symbols U, Z, V, P, S, T, and Q correspond to those shown in FIG. 9. On the other hand, a vertical axis in FIG. 15 represents the pressure on the lubricating oil 5. As illustrated in FIG. 15, the pressure on the lubricating oil 5 in the sixth minute gap U gradually increases in the downward direction, because of the action of the upper pumping groove array 60. The pressure on the lubricating oil 5 in the seventh minute gap V gradually increases in a radially inward direction, because of the action of the upper thrust dynamic pressure generating grooves 70. In the first minute gap P, the pressure has two peaks because of the action of the radial dynamic pressure generating grooves 50a and 50b. In the fourth minute gap S, the pressure gradually increases in the radially inward direction, because of the action of the lower thrust dynamic pressure generating grooves 65. In the fifth minute gap T, the pressure gradually increases in the radially inward direction, because of the action of the lower pumping groove array 55. Moreover, the pressure on the lubricating oil 5 is greater in the vicinity Z of the upper opening portion of the through hole 46 than in the fifth minute gap T. This promotes the downward flow of the lubricating oil 5 within the through hole 46.

Figure 10:
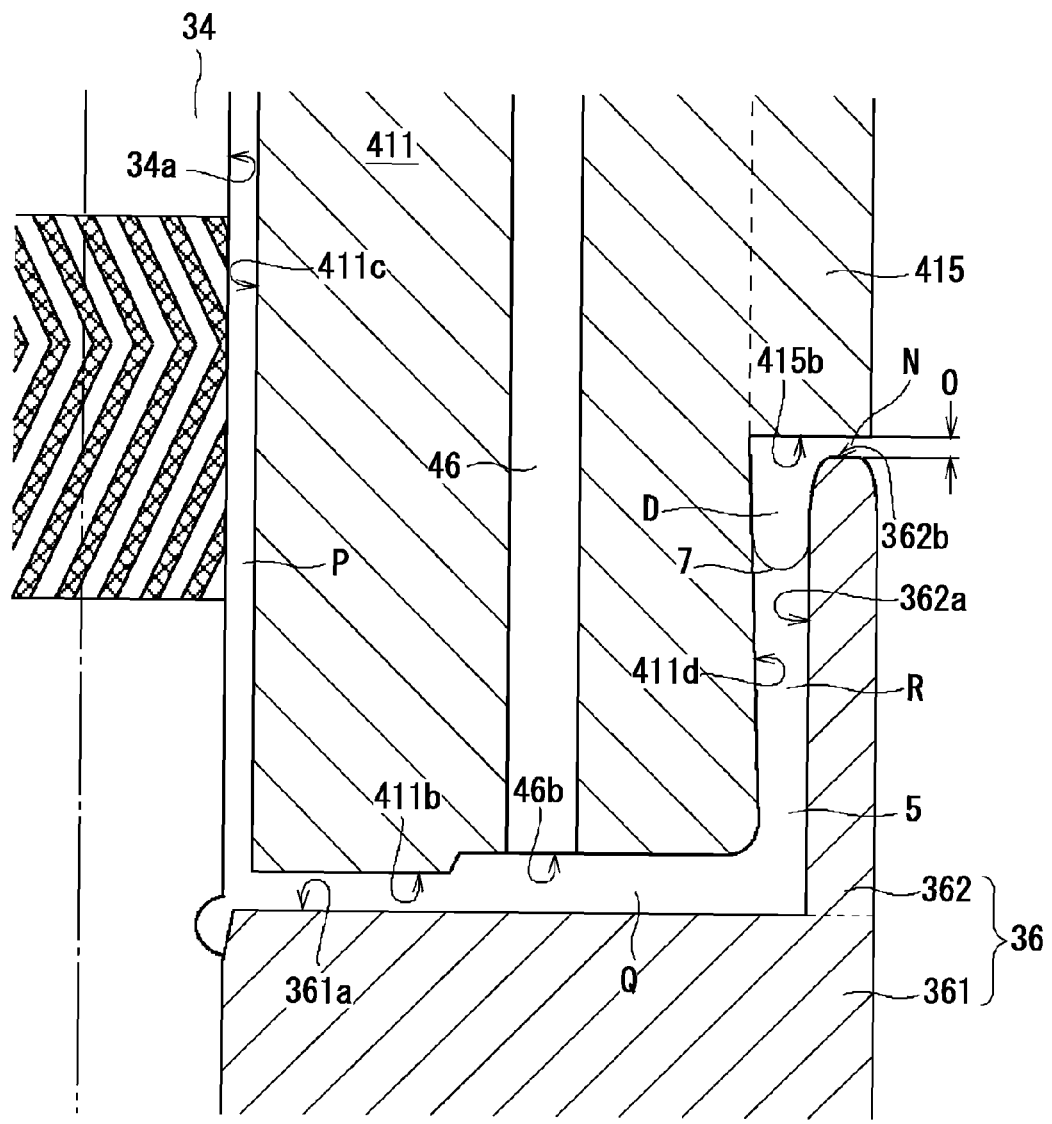
FIG. 10 is a cross-sectional view illustrating a labyrinth structure according to another preferred embodiment of the present invention, taken along a plane including the central axis.

While one exemplary preferred embodiment of the present invention has been described above, it should be appreciated that the present invention is not limited to the above-described preferred embodiment. For example, although the outer circumferential surface 415a of the overhang portion 415 and the inner circumferential surface 362a of the tubular portion 362 preferably are opposed to each other with the minute gap M therebetween in the above-described preferred embodiment, in another preferred embodiment (a second preferred embodiment), as illustrated in FIG. 10, the labyrinth structure may be preferably arranged in such a manner that the lower surface 415b of the overhang portion 415 and an upper surface 362b of the tubular portion 362 are opposed to each other with a minute gap N therebetween. Note that an axial width O of the minute gap N should be sufficiently small. Note that the expression "sufficiently small width" as used herein in reference to the width O refers to a width that is sufficiently small to produce the above-described effect and also to allow air bubbles to be discharged through the minute gap N. In this case, the lower surface 415b of the overhang portion 415 is arranged to be located above the liquid interface of the lubricating oil 5 within the third minute gap R and above the upper surface 362b of the tubular portion 362.

Figure 11:
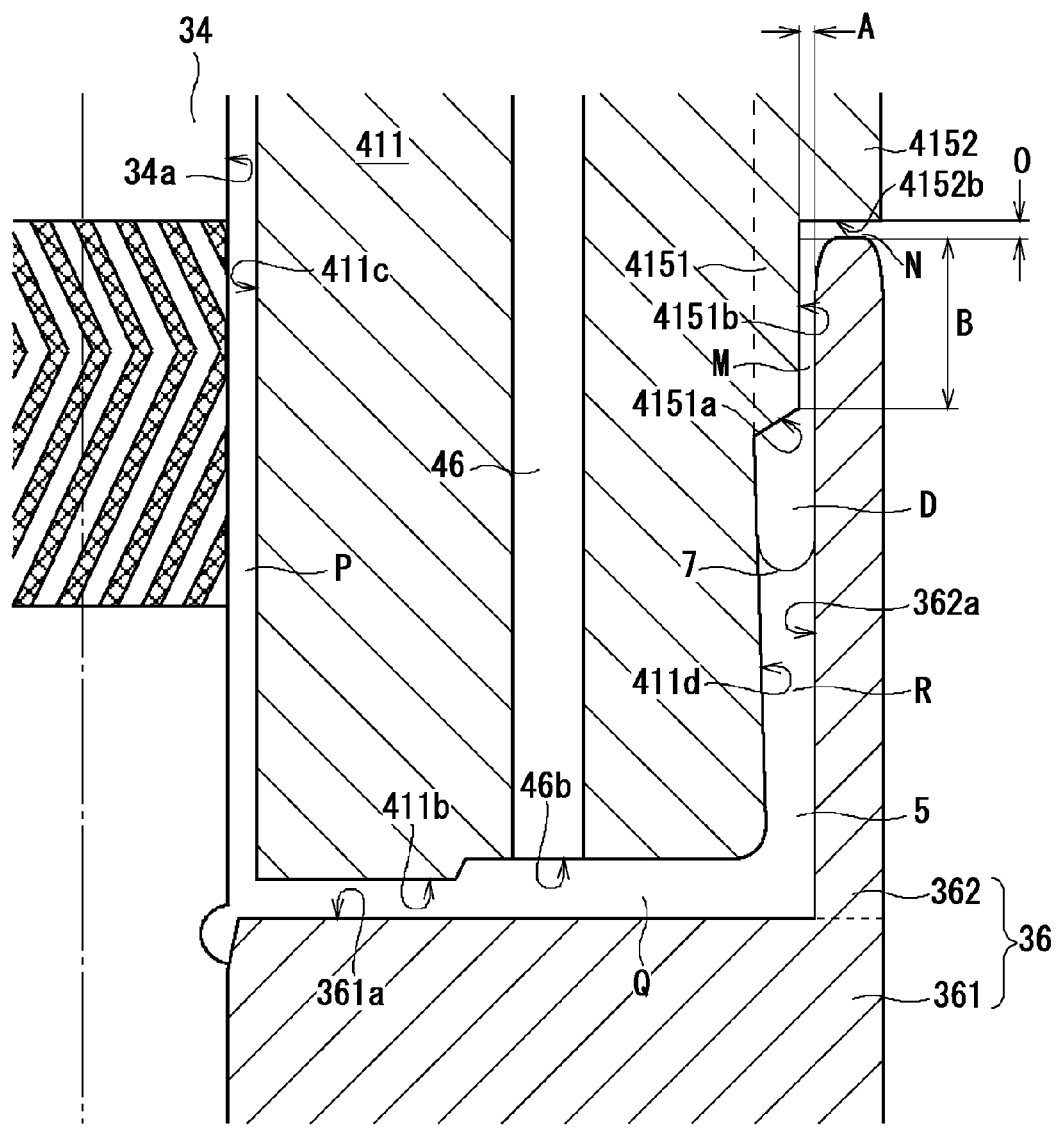
FIG. 11 is a cross-sectional view illustrating a labyrinth structure according to yet another preferred embodiment of the present invention, taken along a plane including the central axis.

Yet another preferred embodiment may be a combination of the above-described two preferred embodiments. Specifically, as illustrated in FIG. 11, the overhang portion 415 may have a two-step structure and include a first overhang portion 4151, which protrudes radially outward from the outer circumferential surface 411d of the cylindrical portion 411 and a lower end of which is located a specified distance above an outer edge portion of the lower surface 411b of the cylindrical portion 411, and a second overhang portion 4152, which protrudes radially outward and a lower end of which is located a specified distance above an outer edge portion of a lower surface 4151a of the first overhang portion 4151. Note that a minute gap M defined between an outer circumferential surface 4151b of the first overhang portion 4151 and the inner circumferential surface 362a of the tubular portion 362, and a minute gap N defined between a lower surface 4152b of the second overhang portion 4152 and the upper surface 362b of the tubular portion 362, are arranged to have a sufficiently small width.

Figure 12:
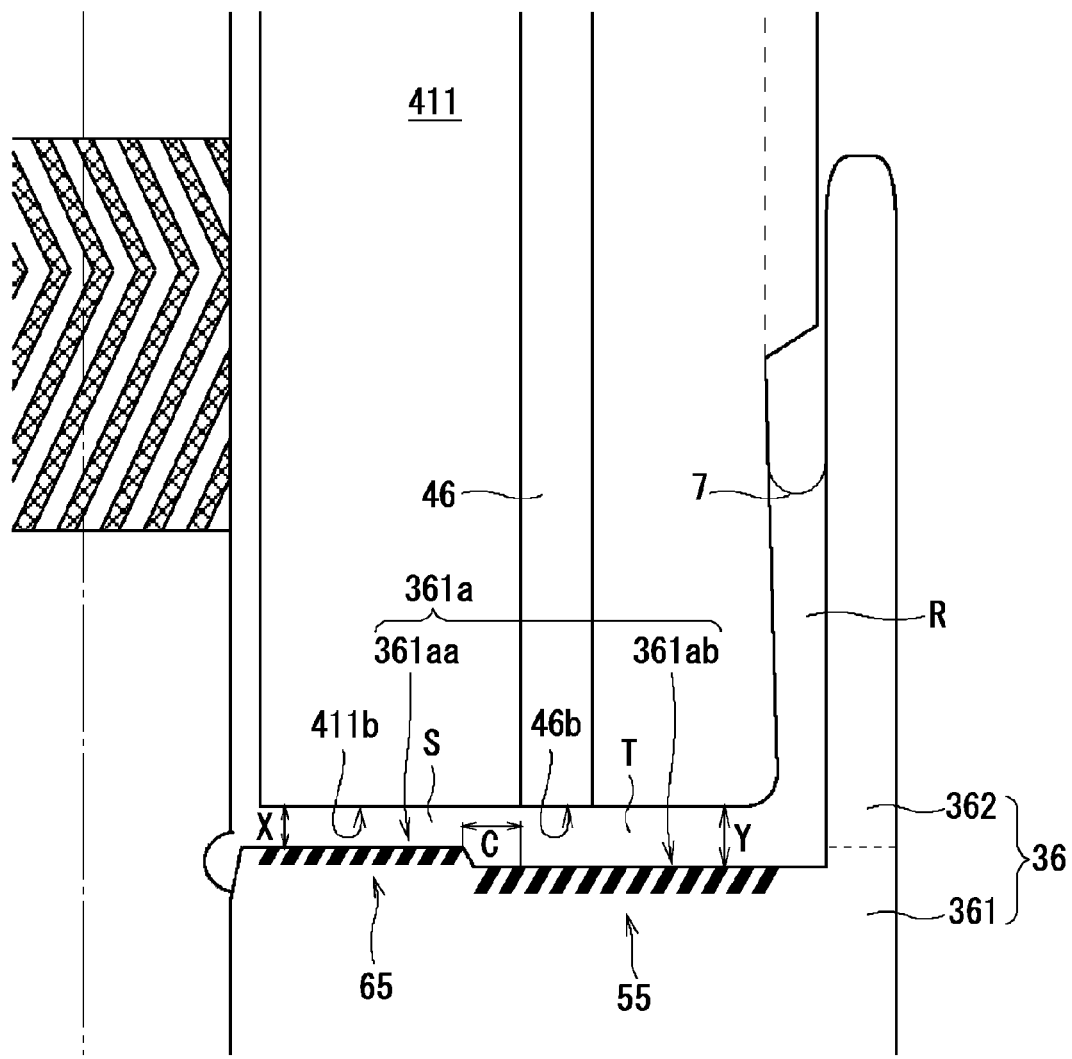
FIG. 12 is a cross-sectional view of the structure of a lower thrust washer and its surroundings according to yet another preferred embodiment of the present invention, taken along a plane including the central axis.

Also, as illustrated in FIG. 12, as a construction to provide a difference in axial width between the radially inner region and the radially outer region of the second minute gap Q, a step may be provided on the upper surface 361a of the lower annular portion 361 of the lower thrust washer 36, which is opposed to the lower surface 411b of the cylindrical portion 411 of the rotating member 41. In more detail, the lower thrust washer 36 is arranged to have, on the upper surface 361a of the lower annular portion 361 thereof, a first flat portion 361aa, which extends substantially perpendicularly to the central axis L, and a second flat portion 361ab, which is arranged adjacent to and radially outward of the first flat portion 361aa and located at a lower level than the first flat portion 361aa. Here, a minute gap defined between the first flat portion 361aa of the lower annular portion 361 and the opposed lower surface 411b of the cylindrical portion 411 corresponds to the aforementioned fourth minute gap S, whereas a minute gap defined between the second flat portion 361ab and the opposed lower surface 411b of the cylindrical portion 411 corresponds to the fifth minute gap T.

The lower pumping groove array 55 may be arranged to stretch over either the whole area or a partial area of the second flat portion 411bb as illustrated in FIG. 4 or the second flat portion 361ab as illustrated in FIG. 12.

Figure 13:
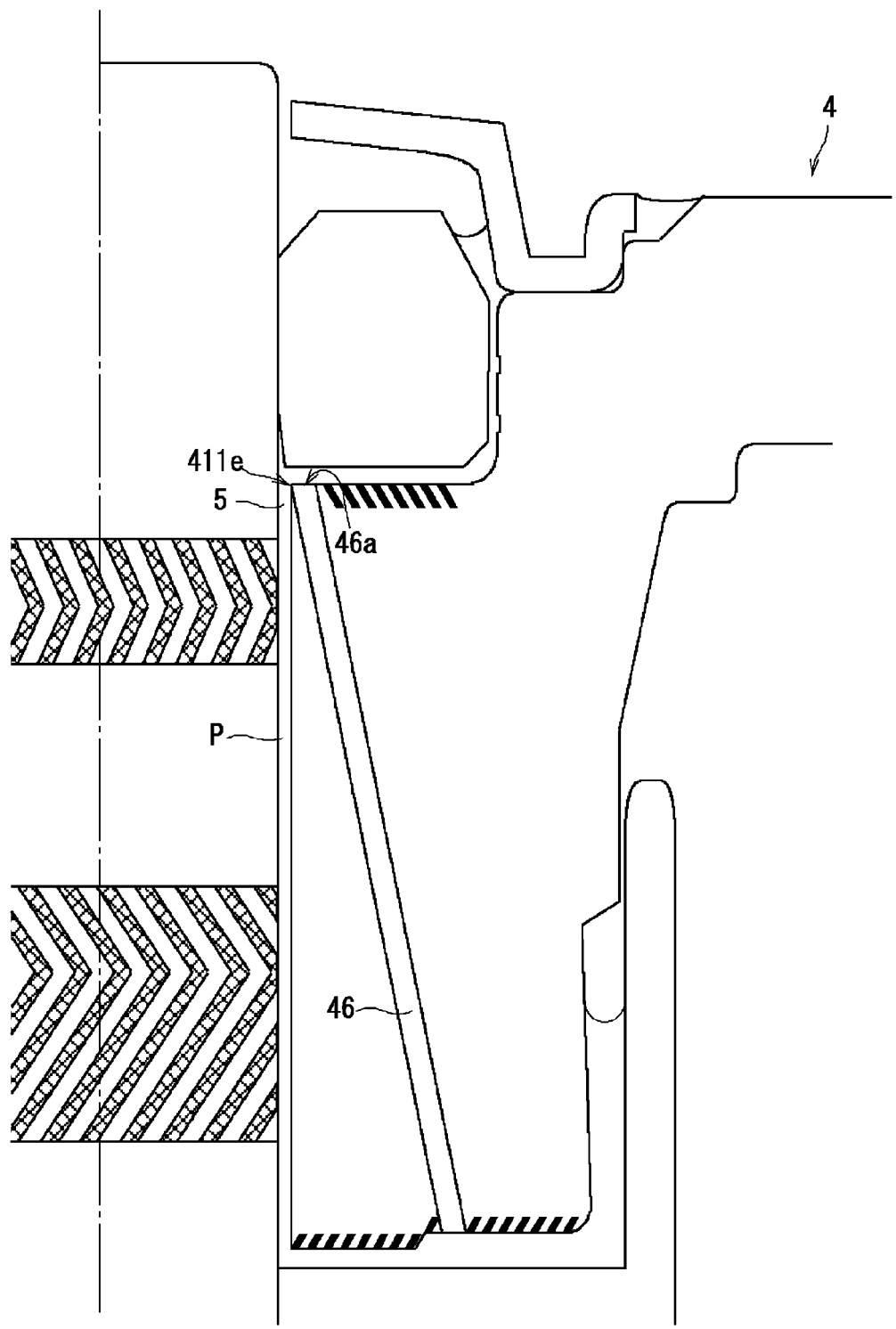
FIG. 13 is a cross-sectional view illustrating a through hole according to yet another preferred embodiment of the present invention, taken along a plane including the central axis.

Also note that, although the upper opening portion 46a of the through hole 46 is open at the upper surface 411a of the cylindrical portion 411 of the rotating member 41 in the above-described present preferred embodiment, it may be open at an inner edge portion 411e of the cylindrical portion 411 to be in direct communication with the first minute gap P, as illustrated in FIG. 13.

Also note that the rotating member 41 may be arranged to include a sleeve 47, which is fit to the outer circumferential surface 34a of the shaft 34 with the first minute gap P therebetween, and a rotor hub 48, which is fixed to or integral with an outer circumferential surface of the sleeve 47. The sleeve 47 is a substantially cylindrical member which is arranged radially outward of the shaft 34 and an inner circumferential surface 47a of which is arranged to surround the shaft 34. The sleeve 47 is arranged such that an upper surface 47b and a lower surface 47c of the sleeve 47 are opposed to the lower surface 35a of the upper thrust washer 35 and the upper surface 361a of the lower annular portion 361 of the lower thrust washer 36 with the seventh minute gap V and the fourth minute gap S therebetween, respectively, and to be rotatable with respect to the shaft 34, the upper thrust washer 35, and the lower thrust washer 36. The rotor hub 48 is a member fixed to the sleeve 47 and arranged to rotate together with the sleeve 47. In shape, the rotor hub 48 expands radially outward around the central axis L.

In this case, a step is provided on the lower surface 47c of the sleeve 47. In more detail, the lower surface 47c of the sleeve 47 is arranged such that the lower surface 47c of the sleeve 47 includes a first flat portion 47ca, which extends substantially perpendicularly to the central axis L, and a second flat portion 47cb, which is arranged adjacent to and radially outward of the first flat portion 47ca and located at a higher level than the first flat portion 47ca. Here, the lower opening portion 46b of the through hole 46 is open at the second flat portion 47cb. In yet another preferred embodiment, a step may be provided on the upper surface 361a of the lower annular portion 361 of the lower thrust washer 36, which is opposed to the lower surface 47c of the sleeve 47, while the lower surface 47c of the sleeve 47 is flat.

Figure 14:
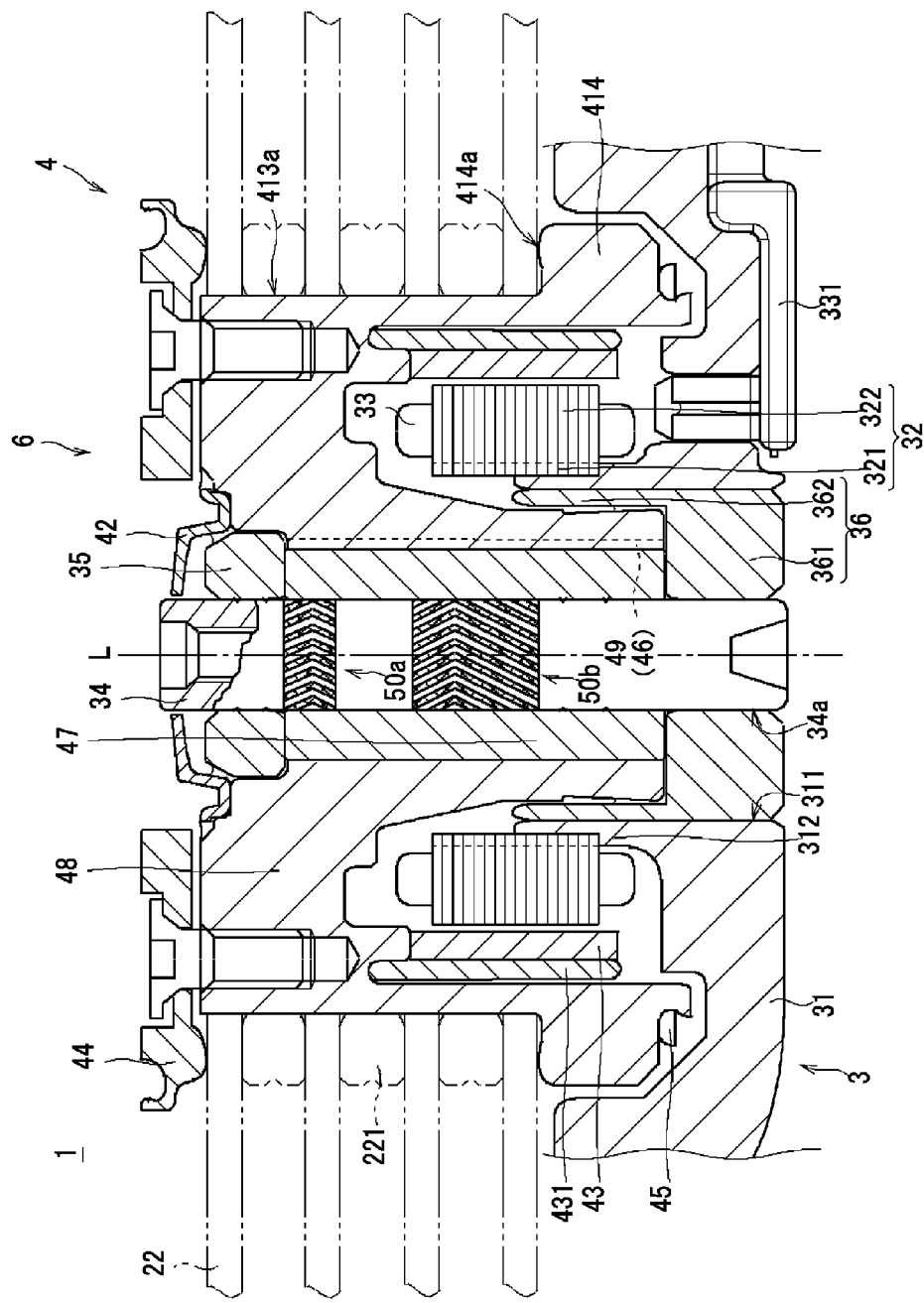
FIG. 14 is a cross-sectional view of a preferred embodiment of the present invention in which a rotating member includes a sleeve and a rotor hub, taken along a plane including the central axis.

Also note that, as illustrated in FIG. 14, an axially extending groove 49 may be provided on an inner circumferential surface 48a of the rotor hub 48 to extend from an upper surface to a lower surface of the rotor hub 48, so that the through hole is defined by the axially extending groove 49 and an outer circumferential surface 47d of the sleeve 47, which is opposed to the inner circumferential surface 48a of the rotor hub 48. In this case, the lower surface 47c of the sleeve 47 corresponds to the first flat portion, while a lower surface 48b of the rotor hub 48 corresponds to the second flat portion. Here, the lower surface 47c (i.e., the first flat portion) of the sleeve 47 is located at a lower level than the lower surface 48b (i.e., the second flat portion) of the rotor hub 48.

Also note that, while the spindle motor 1 including the above-described fluid dynamic bearing apparatus 6 is designed to rotate the magnetic disks 22, the present invention is also applicable to spindle motors designed to rotate other types of recording disks, such as optical discs.

Figure 16:
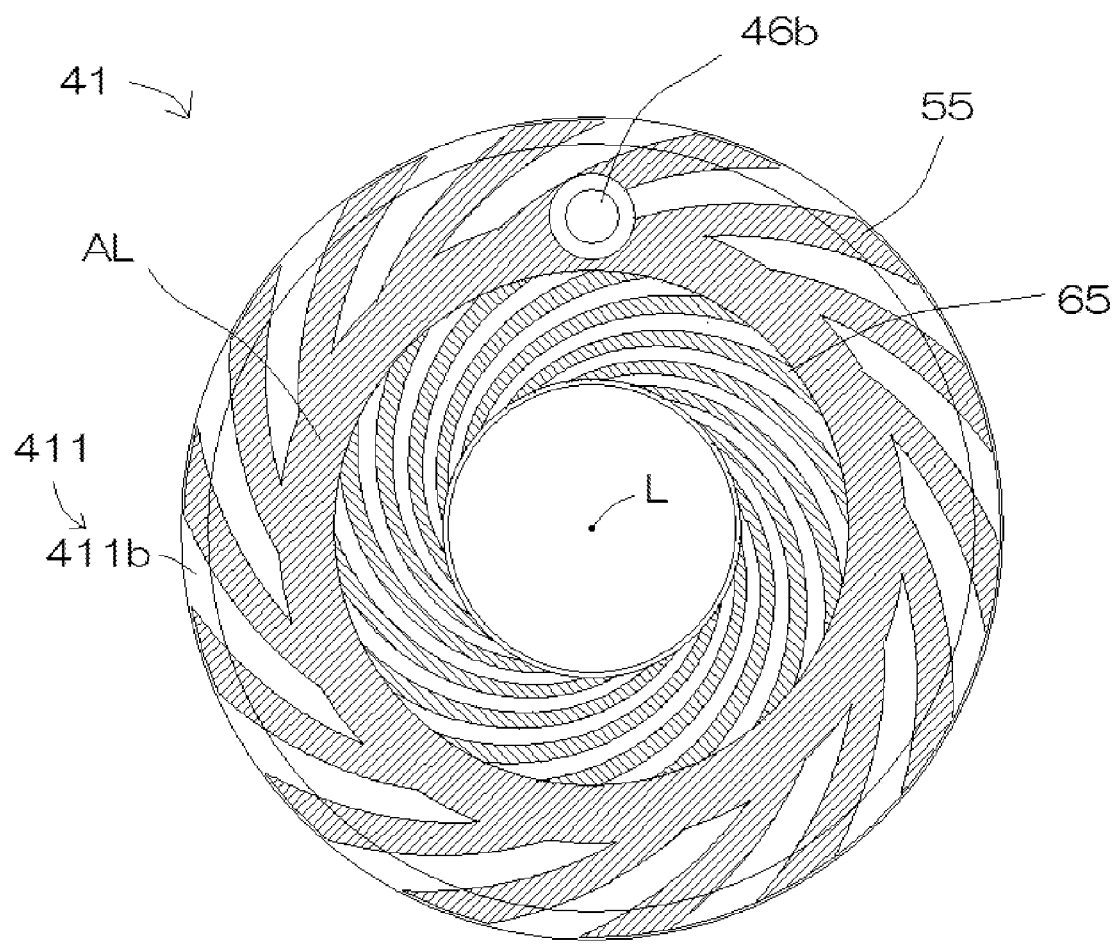
FIG. 16 is a bottom view of a rotating member according to a preferred embodiment of the present invention.
Figure 17:
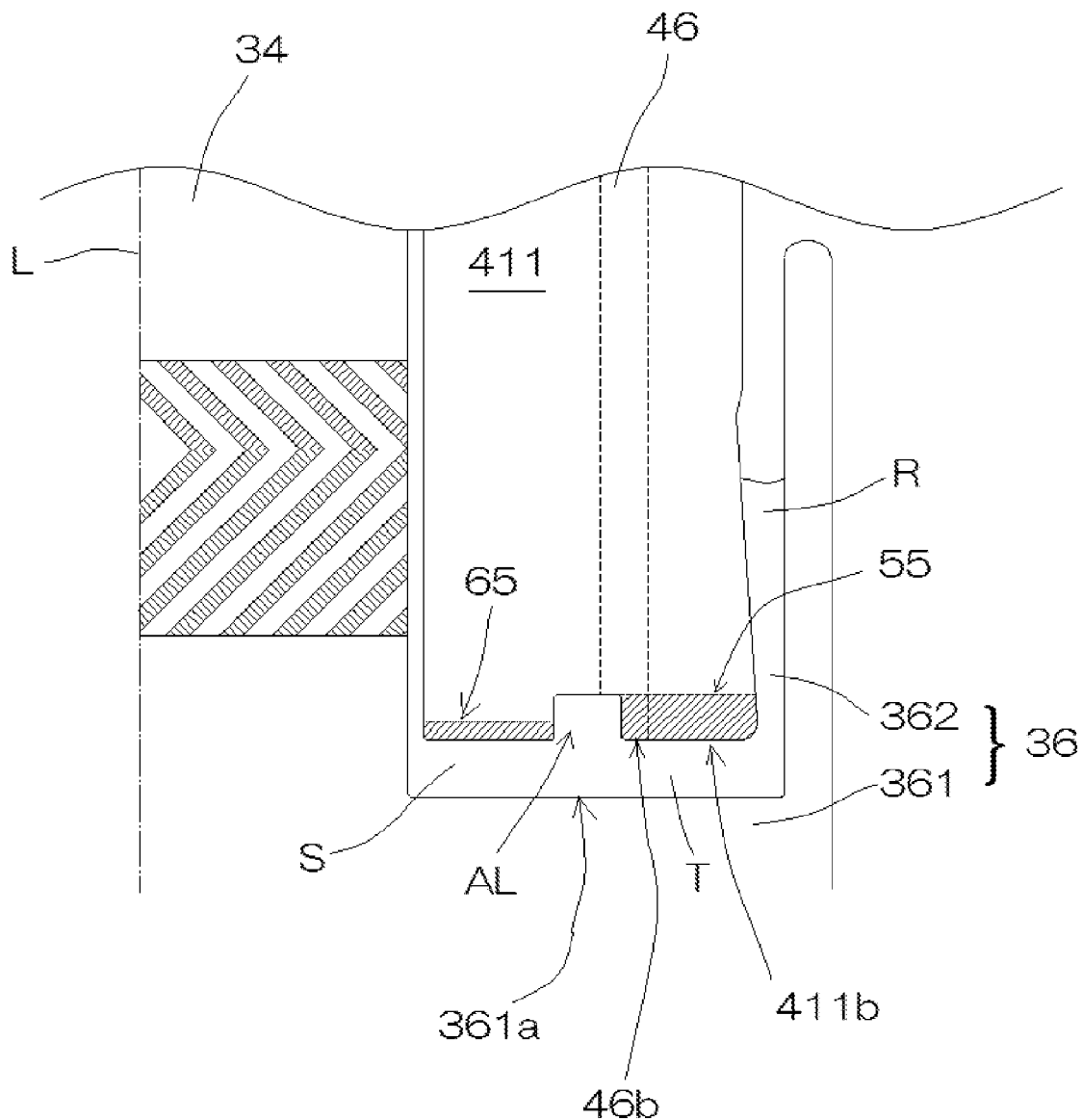
FIG. 17 is a cross-sectional view of the rotating member according to a preferred embodiment of the present invention.

Also note that the shaft may include two or more members. For example, the shaft may include a core member and a cylindrical member fixed to an outer circumferential surface of the core member. In this case, the first minute gap is defined between an outer circumferential surface of the cylindrical member and the inner circumferential surface of the rotating member. The outer circumferential surface of the cylindrical member defines the shaft radial bearing surface. Furthermore, an annular groove, hereinafter referred to as an "all around groove AL" may be defined in at least one of a portion of the lower surface of the cylindrical portion 411 and a portion of the upper surface 361a of the lower annular portion 361 which together define the fifth minute gap T. FIG. 16 is a bottom view of a rotating member 41 according to a preferred embodiment of the present invention. FIG. 17 is a cross-sectional view of the rotating member 41 according to a preferred embodiment of the present invention. In FIGS. 16 and 17, features of each member are illustrated in exaggerated ways for ease and clarity of illustration purposes only.

Referring to FIGS. 16 and 17, a lower surface 411b of a cylindrical portion 411 preferably includes lower thrust dynamic pressure generating grooves 65, an all around groove AL, and lower pumping grooves 55.

The all around groove AL is recessed axially upward into the lower surface 411b. The all around groove AL is arranged to extend in a circumferential direction. The all around groove AL preferably is annular or substantially annular with a central axis L as a center when viewed in an axial direction.

The all around groove AL is arranged radially outward of the lower thrust dynamic pressure generating grooves 65. The all around groove AL is arranged to surround the lower thrust dynamic pressure generating grooves 65 while extending in the circumferential direction. At least one of the lower thrust dynamic pressure generating grooves 65 is arranged to be in communication with the all around groove AL. More preferably, all of the lower thrust dynamic pressure generating grooves 65 are arranged to be in communication with the all around groove AL. In more detail, at least one of the lower thrust dynamic pressure generating grooves 65 is arranged to reach the all around groove AL. Preferably, all of the lower thrust dynamic pressure generating grooves 65 are arranged to reach the all around groove AL. As a result, a lubricating oil is arranged continuously in the lower thrust dynamic pressure generating grooves 65 and the all around groove AL.

Note that the lower thrust dynamic pressure generating grooves 65 may be arranged to extend radially outward beyond the all around groove AL if so desired.

The all around groove AL preferably has an axial depth greater than that of each lower portion of the thrust dynamic pressure generating grooves 65. For example, the all around groove AL may preferably have an axial depth about three times that of each lower portion of the thrust dynamic pressure generating grooves 65. For example, the axial depth of the all around groove AL and the axial depth of each lower thrust dynamic pressure generating groove 65 may preferably be arranged in the range of about 30 µm to about 40 µm and in the range of about 10 µm to about 15 µm, respectively.

Referring to FIG. 16, the axial depth of the all around groove AL is preferably greater than the axial depth of each lower thrust dynamic pressure generating groove 65. In addition, each lower thrust dynamic pressure generating groove 65 is arranged to be in communication with the all around groove AL. This enables the lubricating oil to flow smoothly between an inside of the all around groove AL and an inside of each lower thrust dynamic pressure generating groove 65. In particular, when a spindle motor is stationary, the cylindrical portion 411 of a sleeve and a lower thrust washer 36 are in contact with each other. Even in this condition, smooth flow of the lubricating oil from the all around groove AL into each lower thrust dynamic pressure generating groove 65 is possible. Therefore, the spindle motor is able to start rotating smoothly.

During rotation of the spindle motor, the lubricating oil is drawn radially inward in a radially outer end portion of each lower thrust dynamic pressure generating groove 65. In this preferred embodiment, each lower thrust dynamic pressure generating groove 65 is arranged to be in communication with the all around groove AL, and therefore, the lubricating oil is sufficiently supplied to the radially outer end portion of each lower thrust dynamic pressure generating groove 65. Thus, the likelihood that a negative pressure will occur in the radially outer end portion of any lower thrust dynamic pressure generating groove 65 is reduced. Accordingly, the likelihood that an air bubble will be generated because of the occurrence of a negative pressure is also reduced.

Note that the lower thrust dynamic pressure generating grooves 65 may preferably include an array of grooves arranged in a herringbone pattern, for example.

Referring to FIG. 16, the radial width of an area where the all around groove AL is located is preferably smaller than the radial width of an area where the lower thrust dynamic pressure generating grooves 65 are located.

Each lower pumping groove 55 is preferably arranged radially outward of the all around groove AL. The lower pumping grooves 55 are arranged to surround the all around groove AL while being arranged in the circumferential direction. At least one of the lower pumping grooves 55 is arranged to be in communication with the all around groove AL. Preferably, all of the lower pumping grooves 55 are arranged to be in communication with the all around groove AL. In more detail, at least one of the lower pumping grooves 55 is arranged to reach the all around groove AL. Preferably, all of the pumping grooves 55 are arranged to reach the all around groove AL.

As a result, the lubricating oil is continuously arranged in the lower thrust dynamic pressure generating grooves 65, the all around groove AL, and the lower pumping grooves 55.

Note that a portion of any lower pumping groove 55 may be arranged in the all around groove AL. Also note that a portion of any lower pumping groove 55 may be arranged to extend radially inward beyond the all around groove AL.

Referring to FIG. 17, the axial depth of the all around groove AL is preferably equal to or substantially equal to the axial depth of each lower pumping groove 55.

Referring to FIG. 16, the radial width of the area where the all around groove AL is located is preferably smaller than the radial width of an area where the lower pumping grooves 55 are located.

Furthermore, referring to FIG. 16, the all around groove AL preferably has a groove width greater than that of each lower pumping groove 55. Each lower pumping groove 55 preferably has a groove width greater than a groove width of each lower thrust dynamic pressure generating groove 65. Note, however, that the all around groove AL may have a groove width substantially equal to or smaller than that of each lower pumping groove 55. Also note that each lower pumping groove 55 may have a groove width substantially equal to or smaller than that of each lower thrust dynamic pressure generating groove 65.

A lower opening portion 46b of a through hole 46 is arranged to be open in each of the all around groove AL and at least one of the lower pumping grooves 55.

As described above, an air bubble included in the lubricating oil is caused to travel through the through hole 46, a fifth minute gap T, and a third minute gap R to be discharged to an outside. In this preferred embodiment, the lower opening portion 46b is arranged to be in communication with each of the all around groove AL and the at least one lower pumping groove 55.

An air bubble which has come out of the through hole 46 through the lower opening portion 46b travels to one of the lower pumping grooves 55 through the all around groove AL. A dynamic pressure acting on the lubricating oil in the all around groove AL is preferably the same or substantially the same as a dynamic pressure acting on the lubricating oil in the lower opening portion 46b. The dynamic pressure in the lower opening portion 46b is preferably higher than an atmospheric pressure outside a fluid bearing apparatus. The all around groove AL is capable of causing the dynamic pressure acting on the lubricating oil to be higher than the outside atmospheric pressure. Therefore, provision of the all around groove AL enables the air bubble to be more efficiently discharged to the outside of the fluid dynamic bearing apparatus 6 through the lower pumping groove 55.

The all around groove AL is preferably formed by, for example, electrochemical machining, a cutting process, press working, or the like. Note that the all around groove AL may also be formed by other processing methods. The all around groove AL is preferably formed simultaneously with the lower thrust dynamic pressure generating grooves 65 and the lower pumping grooves 55, for example.

Figure 18:
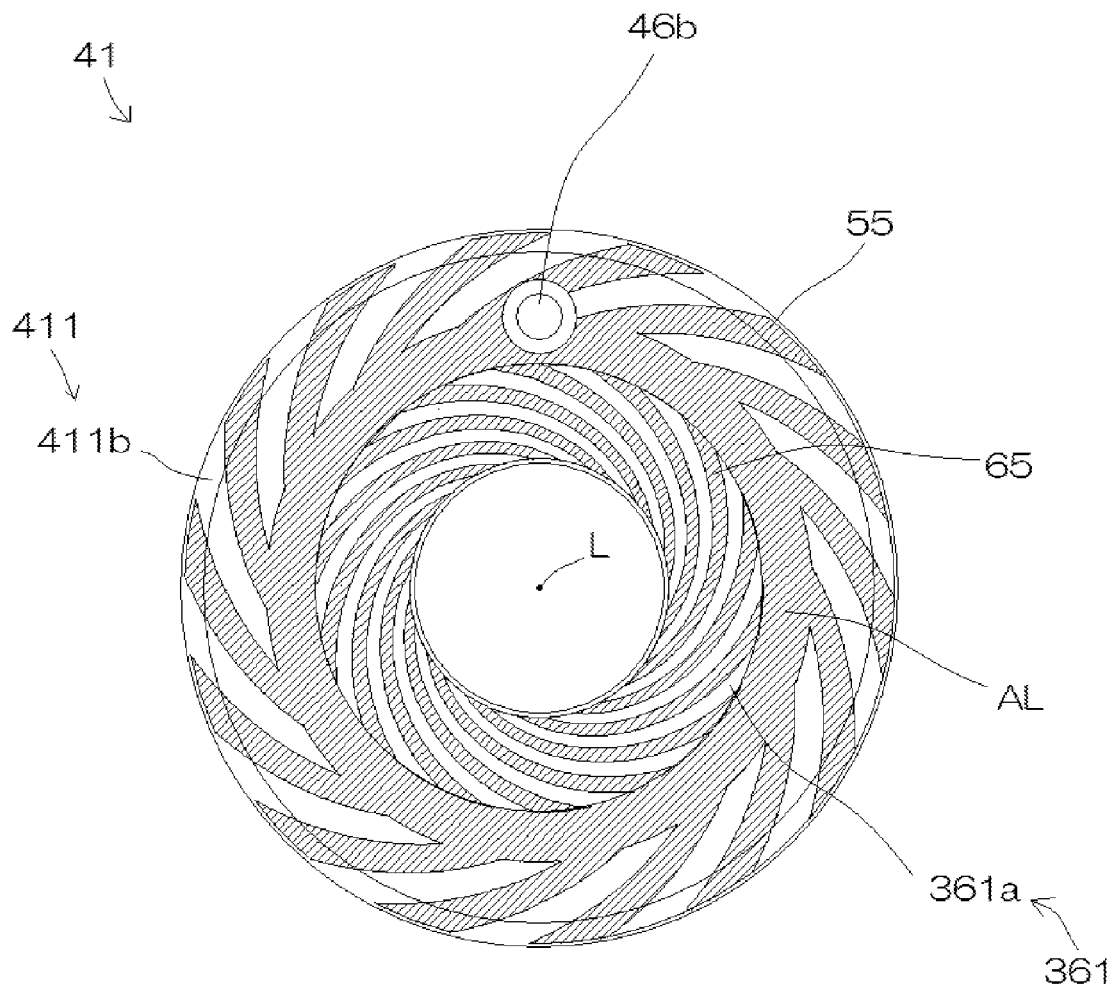
FIG. 18 is a perspective view of a rotating member and a lower annular portion according to a preferred embodiment of the present invention.

Note that the lower thrust dynamic pressure generating grooves 65 may be defined in the lower annular portion 361. FIG. 18 is a perspective view of a cylindrical portion 411 and a lower annular portion 361 according to a preferred embodiment of the present invention. FIG. 18 illustrates an all around groove AL, lower thrust dynamic pressure generating grooves 65, and lower pumping grooves 55 when viewed in the axial direction. In FIG. 18, features of each member are illustrated in exaggerated ways for ease and clarity of illustration purposes only.

Referring to FIG. 18, the all around groove AL and the lower pumping grooves 55 are preferably defined in a lower surface 411b of the cylindrical portion 411, while the lower thrust dynamic pressure generating grooves 65 are defined in an upper surface 361a of the lower annular portion 361. A gap is defined between the lower thrust dynamic pressure generating grooves 65 and the lower pumping grooves 55 (or the all around groove AL). Accordingly, in FIG. 18, the direction of curve of each lower thrust dynamic pressure generating groove 65 is opposite to the direction of curve of each lower thrust dynamic pressure generating groove 65 in FIG. 16. Even in this case, a rotating member 41 is supported in a thrust direction as in the case of the above-described structure.

Each lower thrust dynamic pressure generating groove 65 is arranged radially inward of the all around groove AL. Each lower pumping groove 55 is arranged radially outward of the all around groove AL.

In FIG. 18, as in the case of the structure illustrated in FIG. 16, each of the lower thrust dynamic pressure generating grooves 65 and the lower pumping grooves 55 is preferably arranged to be in communication with the all around groove AL. Accordingly, any air bubble generated in a lubricating oil will travel to one of the lower pumping grooves 55 through a lower opening portion 46b and the all around groove AL. The air bubble is thus easily discharged to the outside.

Note that each of the lower thrust dynamic pressure generating grooves 65 may be arranged axially opposite the all around groove AL. For example, each lower thrust dynamic pressure generating groove 65 may be arranged to extend radially outward to such an extent that a portion of the lower thrust dynamic pressure generating groove 65 is axially opposed to the all around groove AL with the gap intervening therebetween. Furthermore, each lower thrust dynamic pressure generating groove 65 may be arranged to extend radially outward to an extent such that a portion of the lower thrust dynamic pressure generating groove 65 is axially opposed to at least a portion of each lower pumping groove 55. Each lower thrust dynamic pressure generating groove 65 may be shifted radially outward to an extent such that a portion of the lower thrust dynamic pressure generating groove 65 is axially opposed to the all around groove AL or each lower pumping groove 55.

Figure 19:
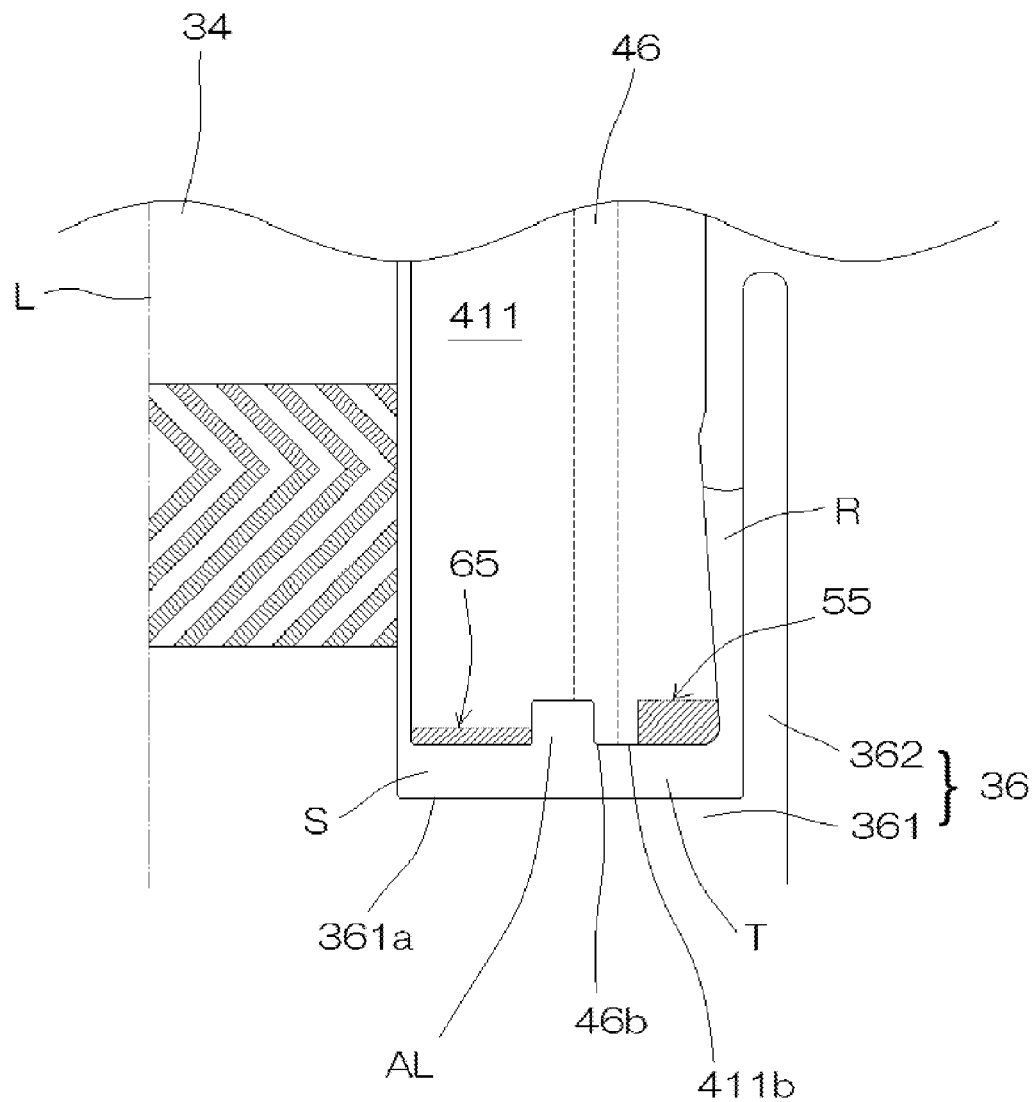
FIG. 19 is a cross-sectional view of a rotating member according to a preferred embodiment of the present invention.

Note that each lower thrust dynamic pressure generating groove 65 may not necessarily be in communication with the all around groove AL. FIG. 19 is a cross-sectional view of a rotating member 41 according to a preferred embodiment of the present invention. In FIG. 19, features of each member are illustrated in exaggerated ways for ease and clarity of illustration purposes only.

Referring to FIG. 19, at least one of lower pumping grooves 55 is radially separated from an all around groove AL. Each of the at least one lower pumping groove 55 is arranged to be out of communication with the all around groove AL.

A lower opening portion 46b is arranged radially inward of the lower pumping groove(s) 55. The lower opening portion 46b is arranged to be in communication with the all around groove AL. The lower opening portion 46b is arranged to be out of communication with the lower pumping groove(s) 55. In other words, in a lower surface 411b, at least a portion of the lower opening portion 46b is arranged between the all around groove AL and the lower pumping groove(s) 55. Even in this case, an air bubble can be guided from the lower opening portion 46b to one of the lower pumping grooves 55 through the all around groove AL. Thus, the air bubble is easily discharged to the outside.

Note that the axial depth of the all around groove AL may be different from the axial depth of each lower pumping groove 55. That is, the axial depth of the all around groove AL may be greater or smaller than the axial depth of each lower pumping groove 55. The radial width of the area where the all around groove AL is located may be equal to or substantially equal to the radial width of the area where the lower pumping grooves 55 are located. The radial width of the area where the all around groove AL is located may be greater or smaller than the radial width of the area where the lower pumping grooves 55 are located.

Note that a section of the all around groove AL taken along a plane including the central axis L may not necessarily be substantially in the shape of a rectangle, but may alternatively be in the shape of a polygon, if so desired. An inside surface which defines the all around groove AL may include a curved surface or an inclined surface which is angled with respect to the central axis L. The inside surface which defines the all around groove AL may include an uneven surface.

The lower opening portion 46b may be arranged to be in communication with only the all around groove AL. The lower opening portion 46b may be arranged to be in communication with at least one of the lower thrust dynamic pressure generating grooves 65.

Various preferred embodiments of the present invention are applicable to a fluid dynamic bearing apparatus, a spindle motor including the fluid dynamic bearing apparatus, and a disk drive apparatus including the spindle motor.

While the present invention has been described with respect to preferred embodiments thereof, it will be apparent to those skilled in the art that the disclosed invention may be modified in numerous ways and may assume many preferred embodiments other than those specifically set out and described above. Accordingly, the appended claims are intended to cover all modifications of the present invention that fall within the true spirit and scope of the present invention.

What is claimed is:

1. A fluid dynamic bearing apparatus comprising:
   a shaft arranged to extend in an upward/downward direction to define a central axis;
   a substantially cup-shaped lower thrust washer including an annular portion arranged to extend radially outward from an outer circumferential surface of the shaft, and a tubular portion arranged to extend upward from an outer edge portion of the annular portion; and
   a rotating member including a cylindrical portion radially opposed to the shaft and arranged to rotate with respect to the shaft; wherein
   a first minute gap defined between the outer circumferential surface of the shaft and an inner circumferential surface of the cylindrical portion, a second minute gap defined between a lower surface of the cylindrical portion and an upper surface of the annular portion axially opposed thereto, and a third minute gap defined between an outer circumferential surface of the cylindrical portion and an inner circumferential surface of the tubular portion radially opposed thereto are in communication with one another, and the first minute gap, the second minute gap, and the third minute gap are all filled with a lubricating oil;
   the rotating member includes a through hole filled with the lubricating oil;
   an upper opening portion of the through hole is in communication with the first minute gap, and a lower opening portion of the through hole is in communication with the second minute gap;
   the third minute gap includes a tapered seal portion where a radial width of the third minute gap gradually decreases in a downward direction;
   the lubricating oil includes a liquid interface located within the tapered seal portion;
   the second minute gap includes a fourth minute gap and a fifth minute gap located radially outward of the fourth minute gap;
   at least one of a portion of the lower surface of the cylindrical portion and a portion of the upper surface of the annular portion, which together define the fourth minute gap, includes a plurality of thrust dynamic pressure generating grooves arranged to induce a fluid dynamic pressure on the lubricating oil held in the fourth minute gap during rotation of the rotating member;
   the fourth minute gap has a smaller axial dimension than an axial dimension of the fifth minute gap;
   the lower opening portion of the through hole is located at the fifth minute gap;
   at least one of a portion of the lower surface of the cylindrical portion and a portion of the upper surface of the annular portion, which together define the fifth minute gap, includes:
      a plurality of dynamic pressure generating grooves arranged to induce a radially inward fluid dynamic pressure on the lubricating oil held in the fifth minute gap during the rotation of the rotating member; and
      an annular groove arranged to surround the central axis, and arranged radially outward of a radially inner end portion of each of the plurality of thrust dynamic pressure generating grooves and radially inward of a radially outer end portion of each of the plurality of dynamic pressure generating grooves; and
   at least one of the plurality of thrust dynamic pressure generating grooves is arranged to be in communication with the annular groove.

2. The fluid dynamic bearing apparatus according to claim 1, wherein
   a radially outer end of at least one of the plurality of thrust dynamic pressure generating grooves is arranged at a radially inner edge of the annular groove or radially outward of the radially inner edge of the annular groove; and
   a radially inner end of at least one of the plurality of dynamic pressure generating grooves is arranged at a radially outer edge of the annular groove or radially inward of the radially outer edge of the annular groove.

3. The fluid dynamic bearing apparatus according to claim 1, wherein the lower opening portion of the through hole is arranged to be in communication with at least one of the annular groove and the plurality of dynamic pressure generating grooves.

4. The fluid dynamic bearing apparatus according to claim 1, wherein all of the plurality of thrust dynamic pressure generating grooves, the annular groove, and the plurality of dynamic pressure generating grooves are defined in the lower surface of the cylindrical portion.

5. The fluid dynamic bearing apparatus according to claim 1, wherein
   the plurality of thrust dynamic pressure generating grooves are defined in the upper surface of the annular portion;
   the annular groove is defined in the lower surface of the cylindrical portion; and
   at least a portion of at least one of the plurality of thrust dynamic pressure generating grooves is arranged axially opposite to the annular groove.

6. The fluid dynamic bearing apparatus according to claim 1, wherein the annular groove is arranged to be in communication with at least one of the plurality of dynamic pressure generating grooves.

7. The fluid dynamic bearing apparatus according to claim 1, wherein the annular groove is arranged to be out of communication with at least one of the plurality of dynamic pressure generating grooves.

8. The fluid dynamic bearing apparatus according to claim 1, wherein the annular around groove has an axial depth greater than an axial depth of each of the plurality of thrust dynamic pressure generating grooves.

9. The fluid dynamic bearing apparatus according to claim 1, wherein the annular groove has an axial depth smaller than an axial depth of each of the plurality of thrust dynamic pressure generating grooves.

10. The fluid dynamic bearing apparatus according to claim 8, wherein the annular groove has an axial depth about three times that of an axial depth of each of the plurality of thrust dynamic pressure generating grooves.

11. The fluid dynamic bearing apparatus according to claim 1, wherein a radial width of an area where the annular groove is located is smaller than a radial width of an area where the plurality of dynamic pressure generating grooves are located.

12. The fluid dynamic bearing apparatus according to claim 1, wherein a radial width of an area where the annular groove is located is greater than a radial width of an area where the plurality of dynamic pressure generating grooves are located.

* * * * *